(12) United States Patent
Kweon et al.

(10) Patent No.: US 12,478,851 B2
(45) Date of Patent: Nov. 25, 2025

(54) TENNIS SELF-TRAINING SYSTEM

(71) Applicant: CURINGINNOS INC., Incheon (KR)

(72) Inventors: Ye Chan Kweon, Suwon-si (KR); Wha Suk Lee, Incheon (KR); Hyuk Jae Lee, Sokcho-si (KR); Seok Hwan Wee, Incheon (KR); Jee Hun Son, Incheon (KR)

(73) Assignee: CURINGINNOS INC., Incheon (KR)

( * ) Notice: Subject to any disclaimer, the term of this patent is extended or adjusted under 35 U.S.C. 154(b) by 317 days.

(21) Appl. No.: 18/024,740

(22) PCT Filed: Sep. 6, 2021

(86) PCT No.: PCT/KR2021/012042
§ 371 (c)(1),
(2) Date: Mar. 3, 2023

(87) PCT Pub. No.: WO2022/050792
PCT Pub. Date: Mar. 10, 2022

(65) Prior Publication Data
US 2023/0372803 A1 Nov. 23, 2023

(30) Foreign Application Priority Data

Sep. 4, 2020 (KR) .......... 10-2020-0113282
Oct. 14, 2020 (KR) .......... 10-2020-0132337

(51) Int. Cl.
*A63B 69/38* (2006.01)
*A63B 24/00* (2006.01)
(Continued)

(52) U.S. Cl.
CPC .......... *A63B 69/38* (2013.01); *A63B 24/0021* (2013.01); *A63B 69/40* (2013.01);
(Continued)

(58) Field of Classification Search
CPC . A63B 69/38; A63B 24/0003; A63B 24/0084; A63B 2024/0025;
(Continued)

(56) References Cited

U.S. PATENT DOCUMENTS 10,912,981 B1 * 2/2021 Ebrahimi Afrouzi ..................... B25J 11/003
2002/0148455 A1 10/2002 Trajkovic et al.
(Continued)

FOREIGN PATENT DOCUMENTS

JP 2002-239052 A 8/2002
KR 10-1586462 B1 1/2016
(Continued)

*Primary Examiner* — Lawrence S Galka
(74) *Attorney, Agent, or Firm* — Maschoff Brennan

(57) ABSTRACT

The tennis self-training system according to an embodiment of the present invention comprising a control device comprising recording unit configured to record a tennis game and a processor configured to analysis the tennis game based on a video obtained from the recording unit; and a ball machine unit configured to move and launch a ball according to the instructions of the control device; wherein the control device is configured to: determine the position of a player and the position of the ball machine unit based on the video, predict a falling position of the ball hit by the player based on the video, calculate a ball launch position and a ball arrival position of the ball machine unit based on the position of the player and the falling position of the ball, generate a control signal related to the ball launch position and the ball arrival position, transmit the control signal to the ball machine unit, wherein the ball machine unit is configured to: receive the control signal from the control device, move to the ball launch position indicated by the received control signal, and launch the ball to the ball arrival position indicated by the received control signal.

9 Claims, 15 Drawing Sheets

(51) Int. Cl.
   *A63B 47/00* (2006.01)
   *A63B 69/40* (2006.01)
   *A63B 71/06* (2006.01)
   *G06T 7/20* (2017.01)
   *G06T 7/73* (2017.01)
   *G06V 10/94* (2022.01)
   *G06V 10/98* (2022.01)
   *G06V 20/40* (2022.01)
   *H04N 23/90* (2023.01)

(52) U.S. Cl.
   CPC ...... *A63B 71/0605* (2013.01); *A63B 71/0669* (2013.01); *G06T 7/20* (2013.01); *G06T 7/73* (2017.01); *G06V 10/945* (2022.01); *G06V 10/98* (2022.01); *G06V 20/42* (2022.01); *G06V 20/46* (2022.01); *H04N 23/90* (2023.01); *A63B 2024/0025* (2013.01); *A63B 2220/05* (2013.01); *A63B 2220/806* (2013.01); *G06T 2207/10016* (2013.01); *G06T 2207/30196* (2013.01); *G06T 2207/30224* (2013.01); *G06T 2207/30228* (2013.01)

(58) Field of Classification Search
   CPC .... A63B 2024/0028; A63B 2024/0031; A63B 2024/0034; A63B 2024/0043; A63B 2024/0081; A63B 2024/0093; A63B 2071/025; A63B 2071/063; A63B 2071/0675; A63B 2071/0683; A63B 2220/05; A63B 2220/10; A63B 2220/20; A63B 2220/30; A63B 2220/806; A63B 2220/833; A63B 2069/402; A63B 2102/02
   See application file for complete search history.

(56) References Cited

U.S. PATENT DOCUMENTS

| | | | |
|---|---|---|---|
| 2008/0200287 A1* | 8/2008 | Marty | A63B 24/0003 700/91 |
| 2008/0269017 A1* | 10/2008 | Ungari | A63B 69/0053 482/4 |
| 2016/0166912 A1* | 6/2016 | Paredes | A63B 63/00 473/462 |
| 2016/0310817 A1* | 10/2016 | Yeager | A63B 69/406 |
| 2019/0022487 A1 | 1/2019 | Joo et al. | |
| 2020/0197782 A1* | 6/2020 | Abdelmoneum | A63B 71/0622 |

FOREIGN PATENT DOCUMENTS

| | | |
|---|---|---|
| KR | 10-2017-0085460 A | 7/2017 |
| KR | 10-2019-0031111 A | 3/2019 |

\* cited by examiner (a)

(b)

(c)

(a)

(b)

(a)

(b)

(a)

(b)

TENNIS SELF-TRAINING SYSTEM

TECHNICAL FIELD

The present invention relates to a tennis self-training system using artificial intelligence, and more specifically, to a tennis self-training system using artificial intelligence that can throw practice balls in response to a player's position and movement and perform refereeing functions.

BACKGROUND ART

Since most tennis matches are played with an opponent, progressing the game is restricted when there is no opponent. To overcome this limitation, in recent years, there have been various devices that allow you to practice tennis on your own. For example, there are ball machines that throw balls to the player's vicinity so that the player can hit practice balls, and there are unmanned referee systems that determine whether the ball hit by the player is out of line. These devices help players to play or practice without the presence of opponents or referees.

However, the conventional unmanned referee system has the disadvantage that it does not have a training function, which limits the actual practice game, and it is difficult to practice systematically because it does not have the function of evaluating and analyzing the player's athletic performance. In addition, the conventional ball machine part throws the ball according to the stored training program, but it cannot throw the ball organically in response to the player's movement or position.

Technical Problem

A problem that the present invention addresses is to provide a tennis self-training system that allows players to play tennis practice matches without time or personnel limitations.

Another problem to be solved by the present invention is to provide a self-training system for tennis that provides a training program suitable for a player's athletic ability or a posture correction program according to an exercise posture.

However, these tasks are exemplary and do not limit the scope of the present invention.

Technical Solution

According to an embodiment of the present invention, a tennis self-training system comprises a control device comprising recording unit configured to record a tennis game and a processor configured to analysis the tennis game based on a video obtained from the recording unit; and a ball machine unit configured to move and launch a ball according to the instructions of the control device; wherein the control device is configured to: determine the position of a player and the position of the ball machine unit based on the video, predict a falling position of the ball hit by the player based on the video, calculate a ball launch position and a ball arrival position of the ball machine unit based on the position of the player and the falling position of the ball, generate a control signal related to the ball launch position and the ball arrival position, transmit the control signal to the ball machine unit, wherein the ball machine unit is configured to: receive the control signal from the control device, move to the ball launch position indicated by the received control signal, and launch the ball to the ball arrival position indicated by the received control signal.

The control device is configured to: determine a falling time point of the ball based on the video, extract an image frame corresponding to the falling time point of the ball from the video, convert a viewpoint of the extracted image frame, and determine the falling position of the ball based on the image frame that the viewpoint is converted.

The control device is configured to: detect the upward and downward movement direction of the ball based on the video, and determine time point when the movement direction changes from the downward direction to the upward direction as the falling time point of the ball.

The control device is configured to determine whether the ball is in-out according to the falling position of the ball.

The control device is configured to calculate game scores according to the determined in-out status.

The recording unit comprises a first camera for photographing one half court and a second camera for photographing the other half court, wherein the control device is configured to: primarily predict the falling position of the ball based on the first video obtained from the first camera, and correct the primarily predicted the falling position of the ball based on the second video obtained from the second camera.

The control device is configured to: receive the location of at least one point on the tennis court from the user, and recognize the line of the tennis court based on the location of at least one point input from the user.

The control device is configured to: recognize the base line and the doubles sideline of the tennis court based on the location of at least one point input from the user, and generate at least one of a service lines, center service lines and singles sideline from the recognized base line and doubles sideline based on the specifications of the tennis court.

The control device is configured to: extract pixels corresponding to the lines in the video based on the location of at least one point input from the user, and recognize the lines from the extracted pixels.

The control device is configured to: obtain user input related to the difficulty of the self-training, and determine the ball arrival position according to the difficulty of the self-training.

The control device is configured to determine the ball arrival position within a predetermined distance range based on the position of the player, wherein the predetermined distance range is set to increase as the difficulty of the self-training increases, so that the ball arrival position is determined to a position farther from the player as the difficulty of the self-training increases.

Advantageous Effects

A tennis self-training system according to one embodiment of the present invention can provide match analysis and customized coaching programs without time constraints and additional cost.

MODES OF THE INVENTION

Figure 1:
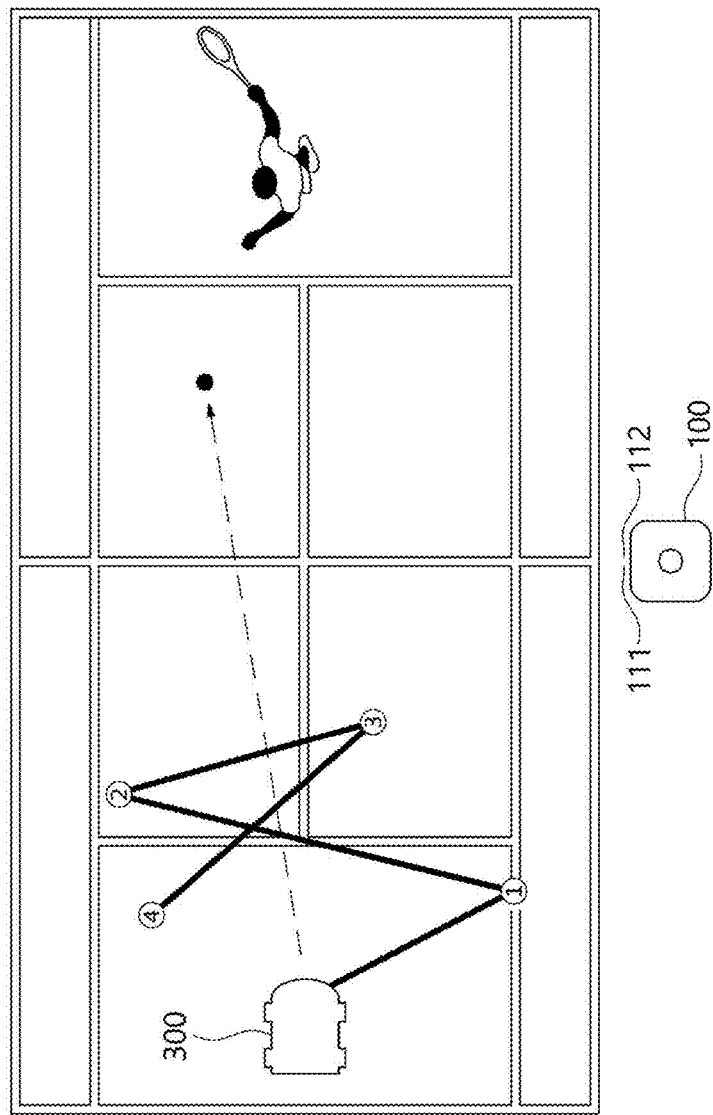
FIG. 1 is a diagram illustrating a tennis self-training system according to one embodiment of the present invention.

Hereinafter, embodiments of the present invention will be described in detail with reference to the accompanying drawings. In describing the present invention, where it is deemed that the addition of specific descriptions of techniques or configurations already known in the art would obscure the gist of the invention, such descriptions are hereby omitted in their entirety. Furthermore, the terms used in this specification are used to appropriately describe embodiments of the present invention, which may vary depending on the person or custom in the art. Accordingly, definitions of these terms should be based on the context of this specification as a whole.

The technical terms used herein are intended to refer only to specific embodiments and are not intended to limit the invention. Singular forms used herein include plural forms unless the context clearly indicates the contrary. As used in the specification, the word "including" is intended to specify certain features, areas, elements, steps, operations, elements, and/or components and is not intended to exclude the existence or added value of other specific features, areas, elements, steps, operations, elements, components, and/or groups.

A tennis self-training system according to one embodiment of the present invention, wherein the tennis self-training system includes a control device, a ball machine unit, and a mobile device connected to each other by wireless communication, the control device converting the movement of a player, the trajectory of a ball, and a stadium into video data, the video data being analyzed by a vision recognition algorithm to derive first data including the position of the ball machine unit, the position of the player, and the position of the ball, a processor that derives second data, which is a result of determining whether the ball is in or out when it touches the ground of the stadium, based on the first data; a storage that stores the video data, first data, and second data; and a communication unit that transmits and receives data by wireless communication with the ball machine unit and a mobile device, wherein the ball machine unit launches the ball based on the first data, and the mobile device receives the video data and analyzed data directly or indirectly from the control device and outputs them to a user, which may be a tennis self-training system.

The processor derives third data comprising a location for the ball machine unit to move to and a direction to launch a ball based on the first data, and the ball machine unit receives the third data from the control device and launches a ball after moving according to the third data.

In recognizing the ball and deriving its position, the processor recognizes an object that satisfies at least two of the following conditions: the first condition of finding a moving object based on differences between successive frames in the image data, the second condition of finding an object corresponding to a preset ball color information by color segmenting the image data, and the third condition of finding an object corresponding to a preset ball width, ratio, and density by detecting contour features of the image data.

The processor calculates an error rate by comparing the predicted next position and the actual next position based on the current speed and direction of movement of the ball, and determines that an object that is measured to be larger than the error rate of the ball or the variation of the error rate is not a ball.

The processor predicts a falling position of the ball based on the first data.

The processor calculates a match score based on the second data.

The control device is fixed to a post of a tennis court.

The ball machine unit moves in response to user input via a mobile device.

The tennis self-training system further comprises a server that receives the video data and the first data from the mobile device or the control device, and derives fourth data including a player's movement pattern, movement skill, and movement posture based on the video data and the first data.

The server analyzes the player's posture based on the fourth data and derives a posture correction solution that can complement the player's posture.

The server analyzes the vulnerability of the player based on the fourth data and derives a vulnerability solution that can compensate for the vulnerability of the player.

The server derives an injury risk level for each body part of the player based on the fourth data.

The server derives a training program corresponding to the player's athletic performance based on the fourth data.

The server transmits the training program to the mobile device, and the mobile device transmits the training program to the control device based on the user's selection.

The ball machine unit outputs a notification signal before the start of the ball launch or before the end of the ball launch according to a setting predetermined by the user.

Hereinafter, a tennis self-training system 1 according to one embodiment of the present invention will be described with reference to the accompanying drawings.

The tennis self-training system 1 is a system that launches a practice ball to a player so that the player can practice tennis alone without an opponent, and calculates a match score by judging the in-out of the ball hit by the player. In addition, it converts the player's movement into video data (image or video) and identifies the player's movement pattern and posture from the video data through vision recognition algorithms to provide solutions for training programs and posture correction according to the player's athletic ability. This allows players to enjoy tennis without the constraints of time and number of people. In addition, players can improve their athletic skills without the direct assistance of a professional coach. Furthermore, professional coaches can utilize the tennis self-training system 1 according to an embodiment of the present invention to provide more effective coaching to players.

The tennis self-training system 1 includes a control device 100, a ball machine unit 300, a mobile device 200, and a server 400 communicably connected via a network 10.

Referring to FIG. 1, the control device 100 captures a player's tennis practice process, converts it into video data, and generates predetermined data through a vision recognition algorithm.

The control device 100 may derive a control signal based on the predetermined data, and the ball machine unit 300 may receive the control signal from the control device 100 and launch a practice ball to the player according to the control signal. At least some of the above predetermined data may be stored or processed and provided to the user via the mobile device 200.

The mobile device 200 may display the video data taken by the control device 100 or the analyzed data derived from the video data to the user. The mobile device 200 may also transmit control signals to the ball machine unit 300 in response to user input from the user.

The server 400 may receive video data from the control device 100 or the mobile device 200 and provide coaching data that can help the user through certain data processing.

In this way, the tennis self-training system 1 is organically connected in each configuration, so that the player can practice tennis by himself, and the player can perform self-training by providing a training program that suits him.

As shown in FIG. 1, the control device 100 may be installed on one side of the net. For example, the control device 100 may be installed on one of two posts supporting the net. While FIG. 1 shows one control device 100 installed on one tennis court, this does not preclude the installation of more than one control device. For example, a pair of control devices may be installed on a single tennis court. In this case, the pair of centerpieces may be installed on each of the two posts supporting the net.

When a pair of control devices is installed, a portion of the first field of view (FOV) of the recording unit provided in the first control device may overlap with a portion of the second FOV of the recording unit provided in the second control device. For example, one of the pair of control devices may be installed facing the other.

When two or more cameras are installed in one control device, the first angle of view may mean the sum of the angles of view of each of the two or more cameras, and the second angle of view is the same. However, it is not necessary that the first angle of view and the second angle of view overlap. For example, the first angle of view may be arranged to cover one half court and the second angle of view may be arranged to cover the other half court.

Figure 2:
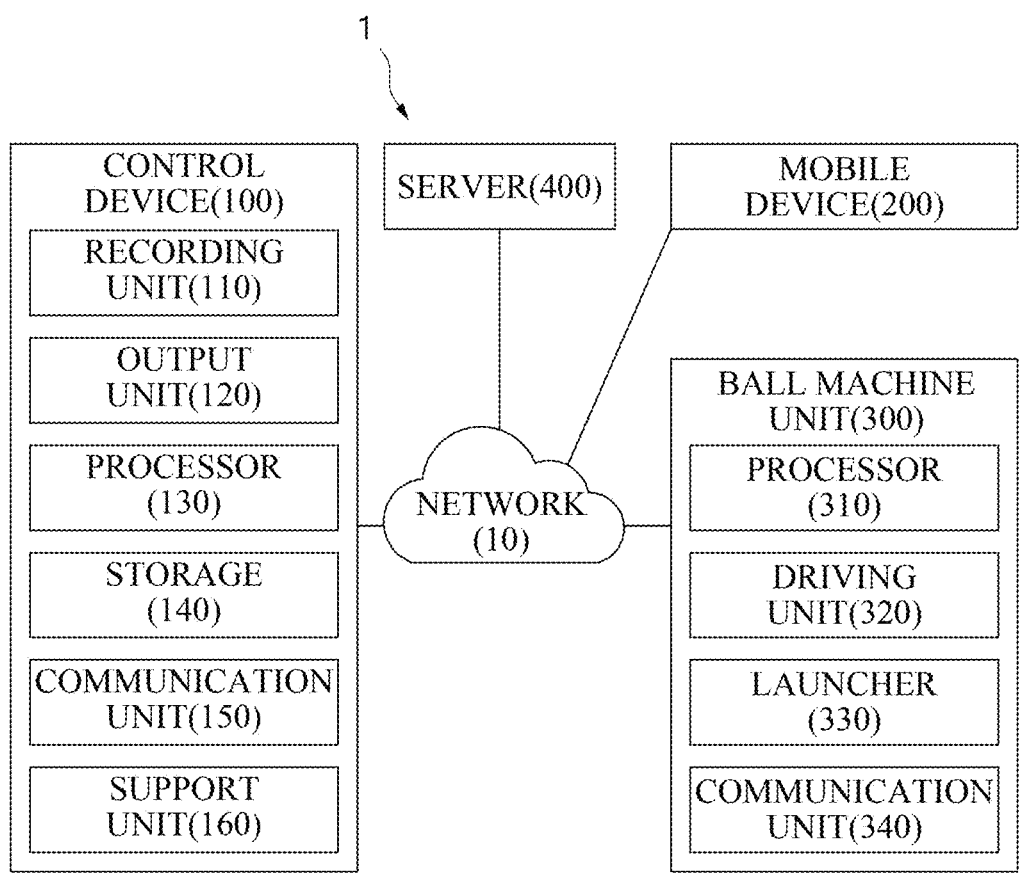
FIG. 2 is a block diagram of a tennis self-training system according to one embodiment of the present invention.

As shown in FIG. 2, the control device 100 may include a recording unit 110, an output unit 120, a processor 130, a storage 140, and a communication unit 150.

The recording unit 110 may record the position and movement of the player or the ball machine, the position (standing point) and movement of the player when the ball is struck, the video of the entire exercise, the momentum of the player, the in/out record of the ball, the trajectory of the ball, the landing location of the ball, and the playing field.

The recording unit 110 may include one or more cameras. The cameras may include image sensors capable of capturing images in the visible light region, and the image sensors may be, but are not limited to, charge coupled device (CCD) sensors, complementary metal-oxide semiconductor (CMOS) sensors, and the like.

The images captured by the recording unit 110 are converted into image data, which can be delivered to the output unit 120, storage 140, mobile device 200, server 400, and the like.

As shown in FIG. 1, the recording unit 110 may include two cameras 111, 112. For example, the first camera 111 may photograph one half court and the second camera 112 may photograph the other half court. In this case, a portion of the field of view of the first camera 111 may overlap with a portion of the field of view of the second camera 112. For example, both the first camera 111 and the second camera 112 may photograph a predetermined area near the net.

Output unit 120 may provide information to a user. The output unit 120 may provide information to the user audibly via sound. In this case, the output unit 120 may include a speaker. The output unit 120 may provide information to the user visually via an image or video. In this case, the output unit 120 may include a display. The output unit 120 may provide information to the user via light, such as an LED.

The operations performed by the control device 100 may be performed by the processor 130, or may be performed by the processor 130 controlling other components of the control device 100.

The processor 130 may perform various information processing and operations within the control device 100. The processor 130 may control other components that comprise the control device 100.

The processor 130 may be implemented as a computer or similar device based on hardware, software, or a combination thereof. In terms of hardware, the processor 130 may be one or a plurality of processors. Alternatively, the processor 130 may be provided with processors that are physically spaced apart and collaborate via communication. Examples of the processor 130 may include, but are not limited to, a control device (CPU), a graphics processing unit (GPU), a digital signal processor (DSP), a state machine, an application specific integrated circuit (ASIC), a radio-frequency integrated circuit (RFIC), and the like. Software-wise, the processor 130 may be provided in the form of a program or application that drives the hardware processor 130.

The processor 130 may perform at least some of the following based on the video data: Recognizing a tennis court, recognizing a ball, tracking a ball, determining when a ball falls, determining when a player hits a ball, determining a ball fall location, determining a ball in or out, calculating a score, predicting a ball fall location, predicting a ball fall time, determining a machine part and a player location, and generating and transmitting control signals to control the ball machine part.

The processor 130 may recognize a tennis court. For example, the processor 130 may recognize a line of a tennis court. The processor 130 may recognize the tennis court based on the video data to derive court information.

According to one embodiment, the processor 130 may recognize a tennis court based on user input. Here, the user input may be indicating a location of a particular point, line, area, or the like on the tennis court. The processor 130 may recognize the tennis court based on criteria obtained from the user input. In one example, the processor 130 may recognize the tennis court using a specific point received from the user as a reference point. In another example, the processor 130 may recognize the tennis court based on a line input from the user as a reference line. In another example, the processor 130 may recognize the tennis court using an area input from the user as a reference area.

Figure 3:
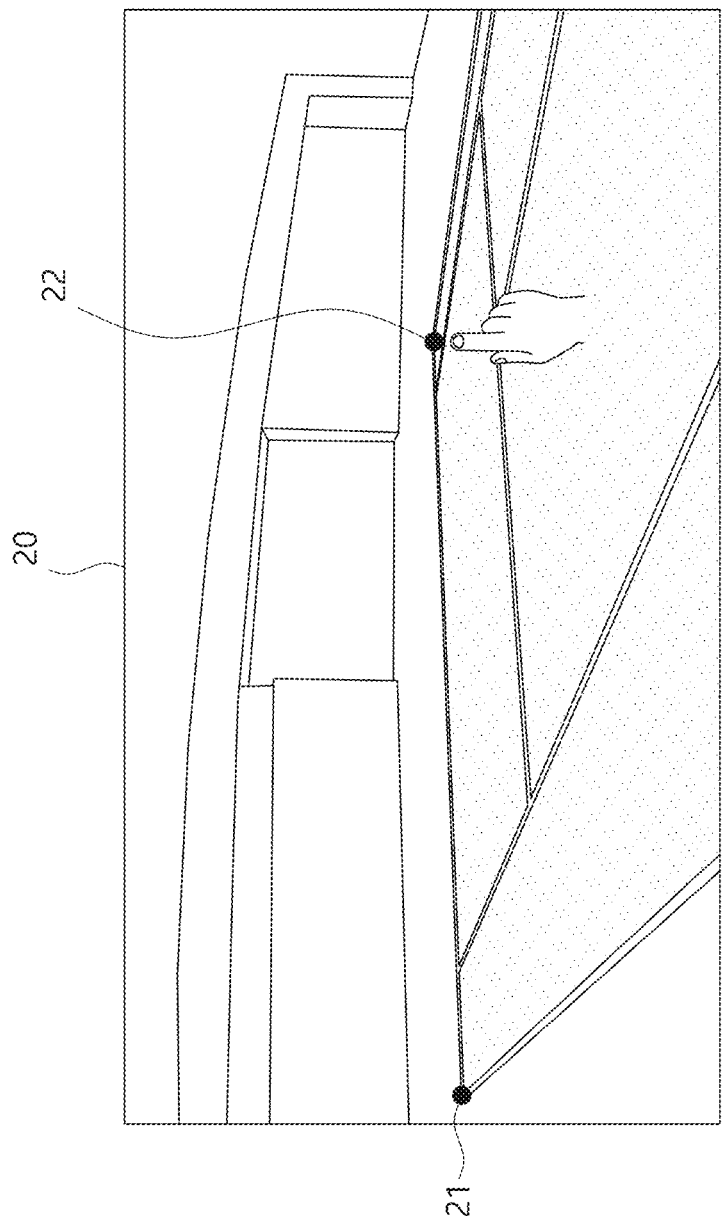
FIG. 3 is a diagram depicting a tennis self-training system according to one embodiment of the present invention obtaining input from a user to recognize a tennis court.

Referring to FIG. 3, the processor 130 may output the tennis court image 20 via the output unit 120 or the mobile device 200.

The processor 130 may then receive input from the user as to the location of the outside corners 21, 22, which are the points where the baseline and doubles sideline of the tennis court meet. For example, the user may input the location of the outer corners 21, 22 by touching the outer corners 21, 22 on the tennis court image 20 displayed on the output unit 120 or on the screen of the mobile device 200 (if the screen is a touch screen), clicking on the outer corners 21, 22 with an input device such as a mouse, or the like. Alternatively, the user may enter the position of the outer corners 21, 22 by positioning two reference points displayed with the tennis court image 20 on the screen of the output unit 120 or the mobile device 200 at the outer corners 21, 22. The processor 130 may visually or audibly output a message to enter the position of the outer corners 21, 22.

Using the inputted positions of the outer corners 21, 22, the processor 130 may recognize a baseline and a doubles sideline on the tennis court image 20 from the tennis court image 20. Since the tennis court has a set dimension (specifications of the tennis court), other lines such as service lines, center service lines, and singles sideline may be virtually generated based on the recognized baseline and doubles sideline. Of course, these other lines may also be recognized from the tennis court image 20 rather than being generated virtually.

While FIG. 3 illustrates receiving input from a user for the positions of the outer corners 21, 22, the positions received from the user are not limited to these. For example, the processor 130 may receive an input from the user of the location of the inside corner, which is the point where the baseline and the singles sideline meet, or may receive an input of both the location of the outside corners 21, 22 and the location of the inside corner, or may receive an input of another point.

Alternatively, the processor 130 may receive input from the user of a line or area that is not a point. For example, the processor 130 may receive input from the user for a baseline and a doubles sideline. In this case, the user may enter the baseline and doubles sideline by slide-touching along the baseline and doubles sideline on the tennis court image 20 displayed on the output unit 120 or on the screen of the mobile device 200 (if the screen is a touch screen), or by dragging and dropping with an input device such as a mouse, or the equivalent. Alternatively, the user may enter the baseline and doubles sideline by positioning the baseline and doubles sideline on the three reference lines displayed with the tennis court image 20 on the screen of the output unit 120 or the mobile device 200.

Hereinafter, recognizing a tennis court and how user input may be used in doing so will be described in more detail with reference to FIG. 4.

Figure 4:
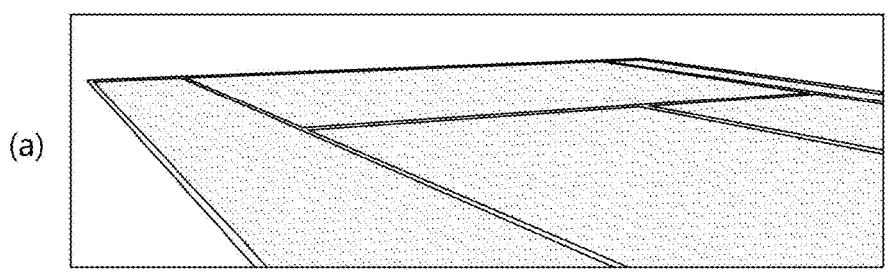
FIG. 4 is a diagram illustrating a control device recognizing a tennis court according to one embodiment of the present invention.
Figure 4:
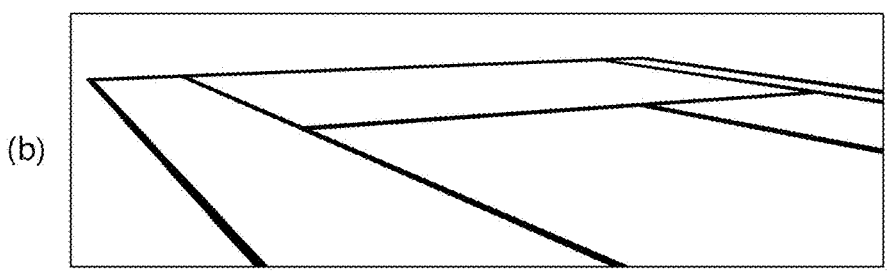
Figure 4:
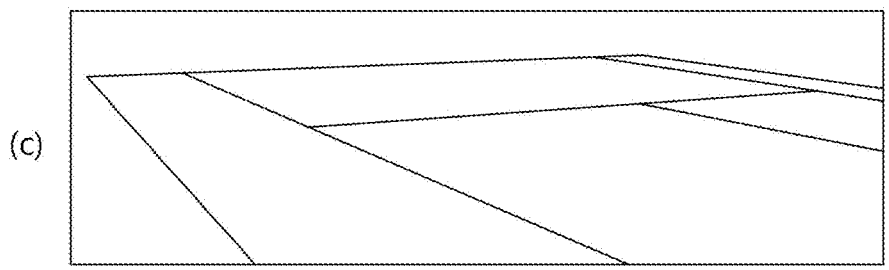

Referring to FIG. 4(*a*), the processor 130 may obtain an image of a tennis court. The processor 130 may perform preprocessing, such as environmental correction, on the tennis court image. For example, the processor 130 may perform preprocessing such as at least some of the following: Environmental correction for perceptual distractors in the image based on the LAB Color Space algorithm (e.g., light level based on usage environment, court material, etc.), filtering noise in the image by applying a Gaussian filter. The preprocessing enables coat recognition in various environments such as daytime, nighttime, in the presence of direct sunlight, and under strong lighting, which can improve the robustness of the coat recognition algorithm.

Referring to FIG. 4(*b*), the processor 130 may extract pixels corresponding to tennis lines from the tennis court image. For example, the processor 130 may extract pixels corresponding to tennis lines by extracting only pixels corresponding to certain colors from the tennis court image. In this case, since tennis lines are typically white in color, the processor 130 may extract pixels corresponding to tennis lines using, but not limited to, white region extraction.

In extracting the pixels corresponding to the tennis lines from the tennis court image, the processor 130 may use user input to extract the pixels corresponding to the tennis lines. In one example, if a reference point (e.g., a location of the outer corners 21, 22) is input from the user, the processor 130 may determine that pixels that can be viewed as adjacent to or connected to the reference point correspond to tennis lines. In another example, if a reference line or a reference area is input from a user, the processor 130 may determine that pixels that are determined to be adjacent to or connected to the reference line or the reference area correspond to tennis lines. Accordingly, the processor 130 may exclude pixels corresponding to noise other than the tennis line, which may improve the accuracy of extracting pixels corresponding to the tennis line. For example, the pixels extracted by the processor 130 through white area extraction may include noise pixels corresponding to the sky or other objects that do not correspond to the tennis line. Since these noise pixels cannot be seen to be adjacent to or connected to the reference point, reference line, or reference area, they can be removed by utilizing the reference point, reference line, or reference area input from the user. Accordingly, the accuracy of extracting the pixels corresponding to the tennis lines may be improved.

Referring to FIG. 4(*c*), the processor 130 may recognize the line of the tennis court from the extracted pixels. For example, the processor 130 may recognize that among the lines generated based on the extracted pixels, a line that is located outwardly relative to the center of the court is a line of the tennis court. In another example, the processor 130 may recognize the lines of the tennis court as pixels that are located outwardly relative to the center of the court among the extracted pixels. Accordingly, the processor 130 may determine whether a ball is in or out based on the recognized line. The processor 130 may recognize the line of the tennis court from the extracted pixels using at least one of the Hough line transformation and RANSAC algorithms, but is not limited to using other methods.

On the other hand, the processor 130 does not necessarily recognize the tennis court based on the user input, and in this case, it may recognize the tennis court based on contents other than the part of recognizing the tennis court based on the user input described above. However, recognizing the tennis court using the user input has the advantage that the line can be recognized more accurately even in situations where the tennis court line is not clearly visible (e.g., aging of the court, chalk court, night lighting, aging paint, temporary court, etc.).

Alternatively, the processor 130 may recognize the lines of the tennis court by detecting the corners and edges of the tennis court in the tennis court image and using clustering to identify straight lines (lines of the tennis court).

The processor 130 may notify the user that the tennis court has been recognized. For example, the processor 130 may output a specific sound to indicate to the user that a tennis court has been recognized.

The processor 130 may recognize a ball. The processor 130 may recognize the ball based on the video data to derive ball recognition information. Here, recognizing the ball may mean detecting a pixel in the video that corresponds to the ball. Alternatively, recognizing the ball may mean detecting coordinates of the ball in the image. Alternatively, recognizing the ball may mean measuring the position of the ball.

According to one embodiment, the processor 130 may recognize the ball using a frame difference image.

Figure 5:
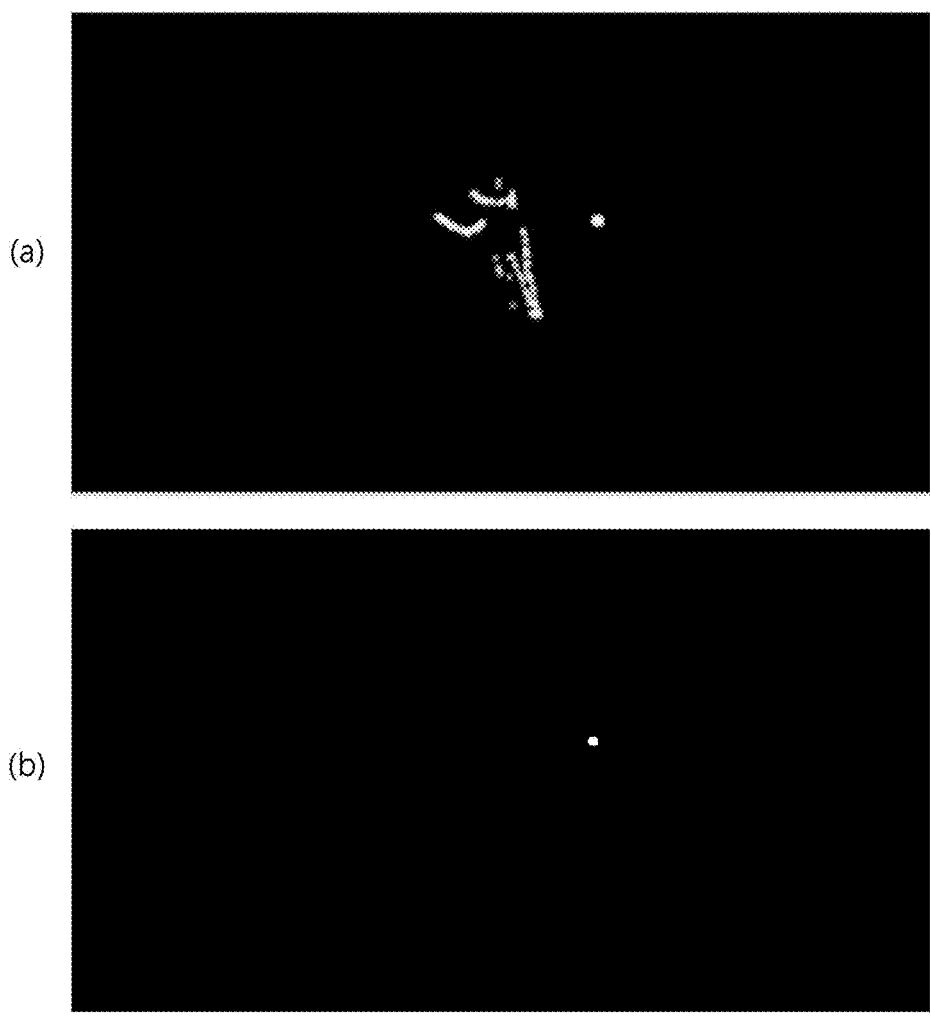
FIG. 5 is a diagram illustrating a control device according to one embodiment of the present invention recognizing a ball using a frame difference image.

Referring to FIG. 5(*a*), the processor 130 may generate a frame difference image from differences between frames in the image data. The frame difference image may include information about an object that has moved between the frames.

Referring to FIG. 5(*b*), the processor 130 may recognize a ball in the frame difference image. Since a video of tennis typically shows not only a moving ball, but also a person or other object moving, and the type of object cannot be determined from the video alone, the processor 130 may need to take additional steps to recognize the ball in the video. For example, the processor 130 may recognize the ball in the video through techniques such as, but not limited to, object detection or segmentation.

As described above, recognizing a ball using a frame difference image is not effective for recognizing a non-moving ball because non-moving objects are not represented in the frame difference image. Therefore, to recognize a non-moving ball, the processor 130 may apply techniques such as object detection or segmentation to the image or video to recognize the ball. This does not necessarily require the use of differential imaging, as moving balls can also be recognized.

The processor 130 may utilize different algorithms for recognizing moving balls and non-moving balls. For example, the processor 130 may utilize an algorithm that utilizes differential imaging when recognizing a moving ball and an algorithm that does not utilize differential imaging when recognizing a non-moving ball.

According to another embodiment, the processor 130 may recognize the ball using color body information. The processor 130 may chromatically segment the image or video and compare it to reference color information that may be used as a preset or stored tennis ball and recognize the corresponding object as a ball. Typically, tennis balls are colored chartreuse, but red, pink, and blue balls may also be used, so the reference color information may be preset or stored so that similarly colored objects may be recognized as balls.

According to another embodiment, the processor 130 may recognize the balls using contour features. The processor 130 may detect contour features of the image data and recognize an object that satisfies at least one of the preset size, proportion, and density as a ball. The processor 130 may derive characteristics such as size, approximation, and center of gravity of the region from the contour features.

The processor 130 may recognize the ball using a combination of two or more of the foregoing embodiments of ball recognition. For example, for two or more of the above embodiments, the processor 130 may view each as a separate condition and recognize an object as a ball if it meets a predetermined number or more of the conditions.

The processor 130 may track the recognized ball. The processor 130 may derive ball tracking information by tracking the ball based on the ball recognition information described above. The ball tracking information may include a path of the ball.

The processor 130 may apply a predetermined algorithm to the ball tracking information to predict the path of the ball. Further, the processor 130 may apply a predetermined algorithm to the ball tracking information to correct the position of the ball. One example of an algorithm that may be used is a Kalman filter. A Kalman filter is an algorithm that uses an object's speed and direction of travel to estimate the next location of the object and calculates an error rate between the actual location and the estimated location to correct the estimate.

The processor 130 may use the ball tracking information to recognize the ball.

For example, if a new ball appears in the image during ball tracking (such as a ball from a neighboring court), or in other words, if multiple balls appear in the image, the ball closest to the tracked ball's movement path can be recognized, or the ball closest to the predicted ball's movement path can be recognized, among the multiple balls.

In another example, a tennis ball moves at a certain predicted speed, acceleration, and direction in the absence of excessive changes in the environment. Accordingly, the error rate of the predicted value is relatively small, but objects that are not balls have a larger error rate or variation in error rate compared to balls, and based on this information, it can be determined that the object is not a ball.

The processor 130 may use the ball tracking information to measure the velocity of the ball. The processor 130 may use the ball tracking information to derive a direction of path of the ball.

The processor 130 may determine when the ball lands on the ground. For example, the processor 130 may derive a time of ball drop based on the ball tracking information.

Figure 6:
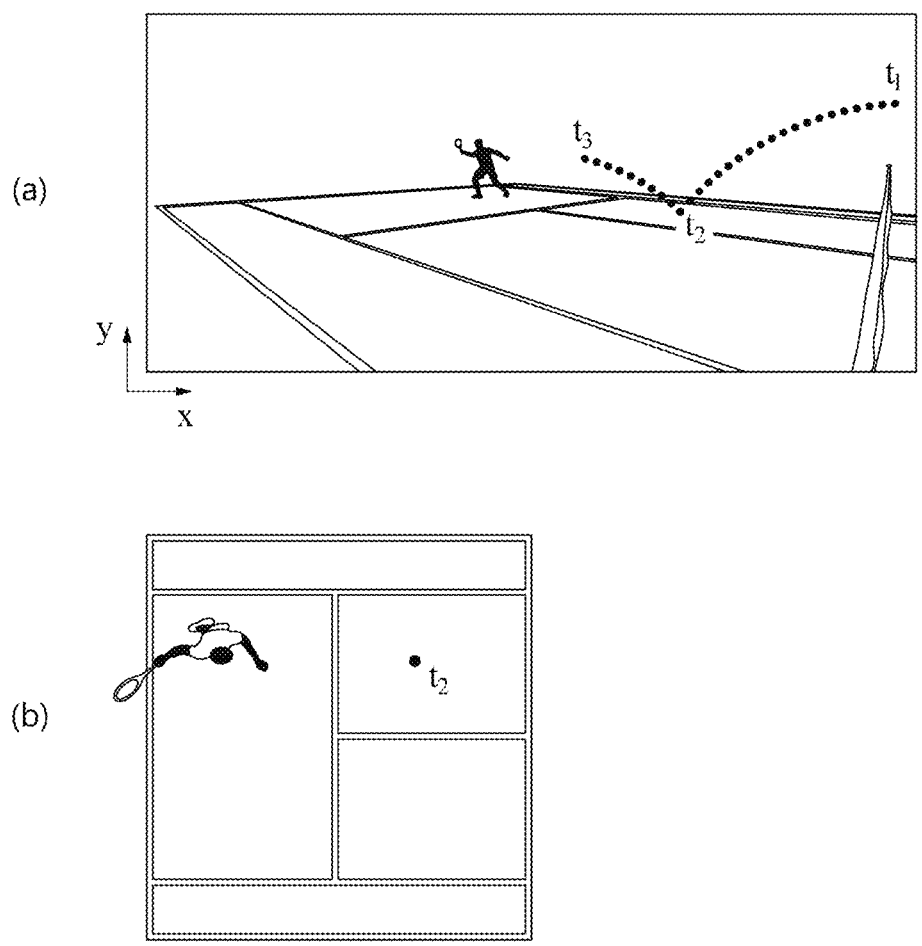
FIG. 6 is a diagram illustrating a control device according to one embodiment of the present invention determining when a ball falls and where it falls.

In one example, the processor 130 may determine a time when the ball lands on the ground by detecting a change in the direction of movement of the ball in the video. Referring to FIG. 6(*a*), from time t1 to time t2, the ball moves downward in the image (the y-value becomes smaller), and from time t2 to time t3, the ball moves upward (the y-value becomes larger). In this case, the processor 130 may determine that the time when the direction of movement of the ball changes from the downward direction to the upward direction is the time when the ball drops.

In another example, the processor 130 may detect the velocity of the ball in the image to determine when the ball has fallen to the ground. Referring to FIG. 6(*a*), when the velocity in the upward direction is set to + (positive), the time when the sign of the velocity in the y-axis direction of the ball changes from − to + is the time when the ball lands on the ground. Thus, the processor 130 may determine that the time when the sign of the velocity of the ball in the y-axis direction changes in the video is the time when the ball falls.

The processor 130 may determine when the player hit the ball. For example, processor 130 may determine when a player has hit the ball based on ball tracking information.

In one example, the processor 130 may determine when the player hit the ball by detecting a change in the direction of movement of the ball in the video. Referring to FIG. 6(*a*), before the player hits the ball, the ball is moving in a leftward direction in the image (the x-value is decreasing), and after the player hits the ball, the ball is moving in a rightward direction (the x-value is increasing). In this case, the processor 130 may determine that the point at which the direction of movement of the ball changes from a leftward direction to a rightward direction is the point at which the player hits the ball.

In another example, the processor 130 can determine when a player has hit the ball by detecting the speed of the ball in the video. Referring to (a) of FIG. 6, when the velocity of the ball in the right direction is set to + (positive), the time when the sign of the velocity of the ball in the x-axis direction changes from − to + is the time when the player hits the ball. Therefore, the processor 130 can determine that the time when the sign of the velocity of the ball in the x-axis direction changes in the image is the time when the player hits the ball.

In doing so, the processor 130 may also estimate the position of the player when the player hits the ball. The processor 130 may predict that the player is located near the position of the ball at the time the player is determined to have hit the ball.

The processor 130 may determine where the ball lands. The processor 130 may derive the ball drop location information based on at least some of the aforementioned ball recognition information, the ball tracking information, and the time of the ball drop.

The processor 130 may determine the fall location of the ball based on the time of the ball's fall.

According to one embodiment, the processor 130 may determine the falling position of the ball through a perspective transformation of the video at the time the ball falls to the ground. Referring to FIG. 6(b), since the ball falls to the ground at time t2, the video at time t2 can be converted from a side view or a perspective view to a top view through a perspective transformation algorithm such as a projection transformation to determine the falling position of the ball. At this time, the processor 130 may perform the perspective conversion based on the recognized tennis court line as described above.

The processor 130 may provide the viewpoint conversion image, such as a flat view, to the user via the control device 100 or the mobile device 200. This allows the user to visually determine whether the ball is in or out.

However, it is not necessary to determine the falling position of the ball through perspective conversion, and the processor 130 may determine the falling position of the ball from the video at the time the ball falls to the ground without perspective conversion.

The processor 130 may determine whether the ball is in or out by determining the line of the tennis court and the location of the ball's fall. The processor 130 may determine that the ball is in if the falling position of the ball is inside the court relative to the line. The processor 130 may determine that the ball is out if the ball's landing location is outside the court relative to the line.

The processor 130 may calculate a score.

In one example, the processor 130 may calculate a score based on the out-of-bounds determination of the ball. If the ball is ruled to be a lineout, the processor 130 may award a point to the half court side where the ball landed. The processor 130 may award points to the opposing side if the ball is ruled a line-in but the player fails to hit the ball. In this way, a match score may be calculated according to the well-known scoring system of tennis.

In another example, the processor 130 may calculate a score by determining if the ball is caught in the net. The processor 130 may determine if the ball is caught in the net by detecting a direction of movement of the ball near the net. If the direction of movement of the ball changes near the net, the processor 130 may determine that the ball is caught in the net, and may calculate a score based on the change.

The processor 130 may predict at least one of a location of a fall of the ball and a time of the fall. The processor 130 may derive the ball fall location prediction information by predicting where the ball will fall based on at least some of the ball recognition information and ball tracking information described above. The processor 130 may derive the prediction information of the time of fall of the ball by predicting a time when the ball will fall based on at least some of the ball recognition information and the ball tracking information described above.

Figure 7:
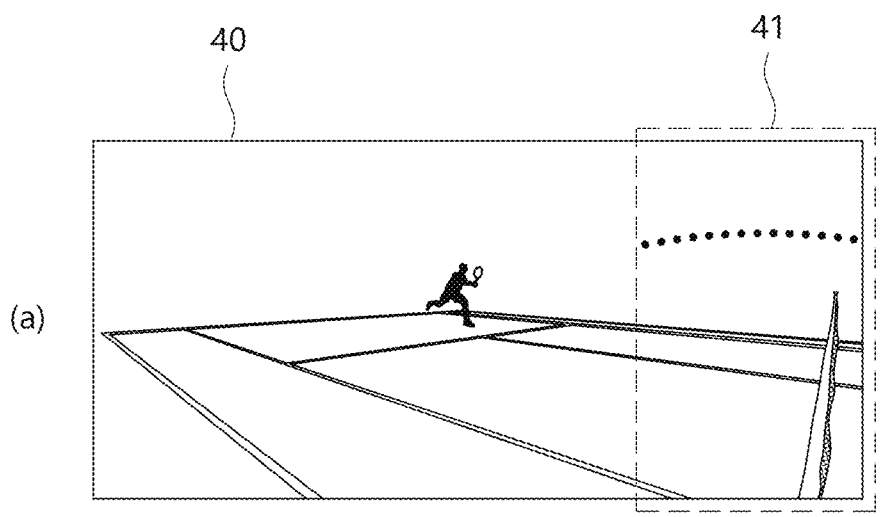
FIG. 7 is a diagram illustrating a control device according to one embodiment of the present invention predicting a falling position of a ball and a falling time point.
Figure 7:
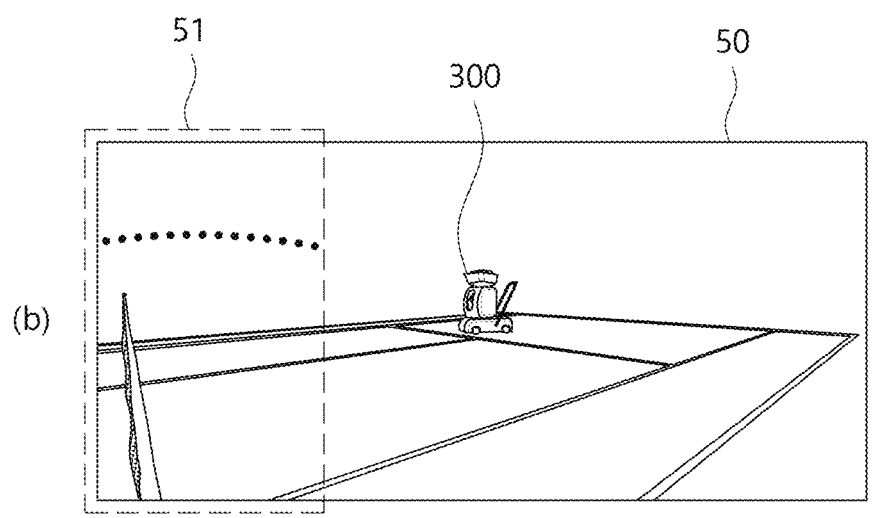

Referring to FIG. 7, the processor 130 may predict a drop location of the ball using the ball passing through the preset regions 41, 51 in the images 40, 50. For example, the processor 130 may estimate the three-dimensional coordinates of the ball passing through the preset regions 41, 51 in the images 40, 50, and use them to predict the drop location of the ball. The preset region 41, 51 may be an area within the video 40, 50 that includes or is adjacent to the net.

According to one embodiment, the processor 130 may first predict a falling position of the ball and then secondly correct the falling position to predict a final falling position. For example, as illustrated in FIG. 1, two cameras 111, 112 may photograph the left half court and the right half court, respectively. In this case, when the ball passes from the left half court to the right half court as shown in FIG. 7, the final falling position can be predicted by first predicting the falling position with the image 40 of the camera shooting the left half court and secondly correcting the falling position with the image 50 of the camera shooting the right half court. However, in this case, it is not necessary to use both images from the two cameras 111 and 112 to predict the fall position. The processor 130 may predict the fall position two times using only the left half-court image, or it may predict the fall position two times using only the right half-court image. Additionally, the processor 130 may predict the drop location over three or more time periods, similar to predicting the drop location over two time periods.

Because the processor 130 can predict the time of the ball's drop in the same manner as the location of the ball's drop, a description of predicting the time of the ball's drop is omitted.

The processor 130 may determine the location of the ball machine unit 300. The processor 130 may determine the location of the player. The processor 130 may use various vision recognition algorithms, such as object detection algorithms, object tracking algorithms, image segmentation algorithms, etc. to determine the location of the ball machine unit 300 and/or determine the location of the player. In determining the location of the ball machine unit 300 and/or determining the location of the player, the foregoing description of ball recognition and ball tracking may be applied by the processor 130.

The processor 130 may generate control signals to control the ball machine unit 300. The processor 130 may generate the control signal based on at least some of the following: court information, ball recognition information, ball tracking information, a time of ball drop, a time when a player hits the ball, a location of the ball drop information, a prediction of the location of the ball drop, a location of the ball machine unit 300, and a location of the player. The control signal may include at least one of a location to be moved by the ball machine unit 300, a location to be reached by the ball to be launched, a direction to launch the ball, a composition of the ball to be launched, a speed of the ball to be launched, and a time to launch the ball.

The processor 130 may transmit the control signals to the ball machine section 300. The ball machine unit 300 may perform an action, such as moving or launching a ball, in response to the control signal. More specific details of the operation of the ball machine unit 300 in response to the control signal will be described later.

The storage 140 stores data necessary for the operation of the control device 100 or data generated during the operation, such as video data, court information, ball recognition information, ball tracking information, ball arrival time point, the time the player hits the ball, the location of the ball, the prediction of the location of the ball, the location of the ball machine unit 300 and the location of the player, score calculation results, control signals, etc.

A storage 140 may be a storage medium for storing the above data. Such storage 140 may be a flash memory type, a hard disk type, a multimedia card micro type, a card type of memory (e.g., SD or XD memory, etc.), random access memory (RAM), static random access memory (SRAM), read only memory (ROM), electrically erasable programmable read only memory (EEPROM), programmable read only memory (PROM), magnetic memory, magnetic disk, and optical disk, at least one of which may be, but is not limited to.

The communication unit 150 may be communicably coupled over the network 10 with at least some of the ball machine unit 300, the mobile device 200, and the server 400 to transmit and receive data wired and wirelessly. The wired and wireless communications may be implemented in a variety of ways.

A wireless communication method may utilize wireless internet technology. Wireless Internet technologies include, for example, Bluetooth (bluetooth), Wireless LAN (WLAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced), and 5G.

Figure 8:
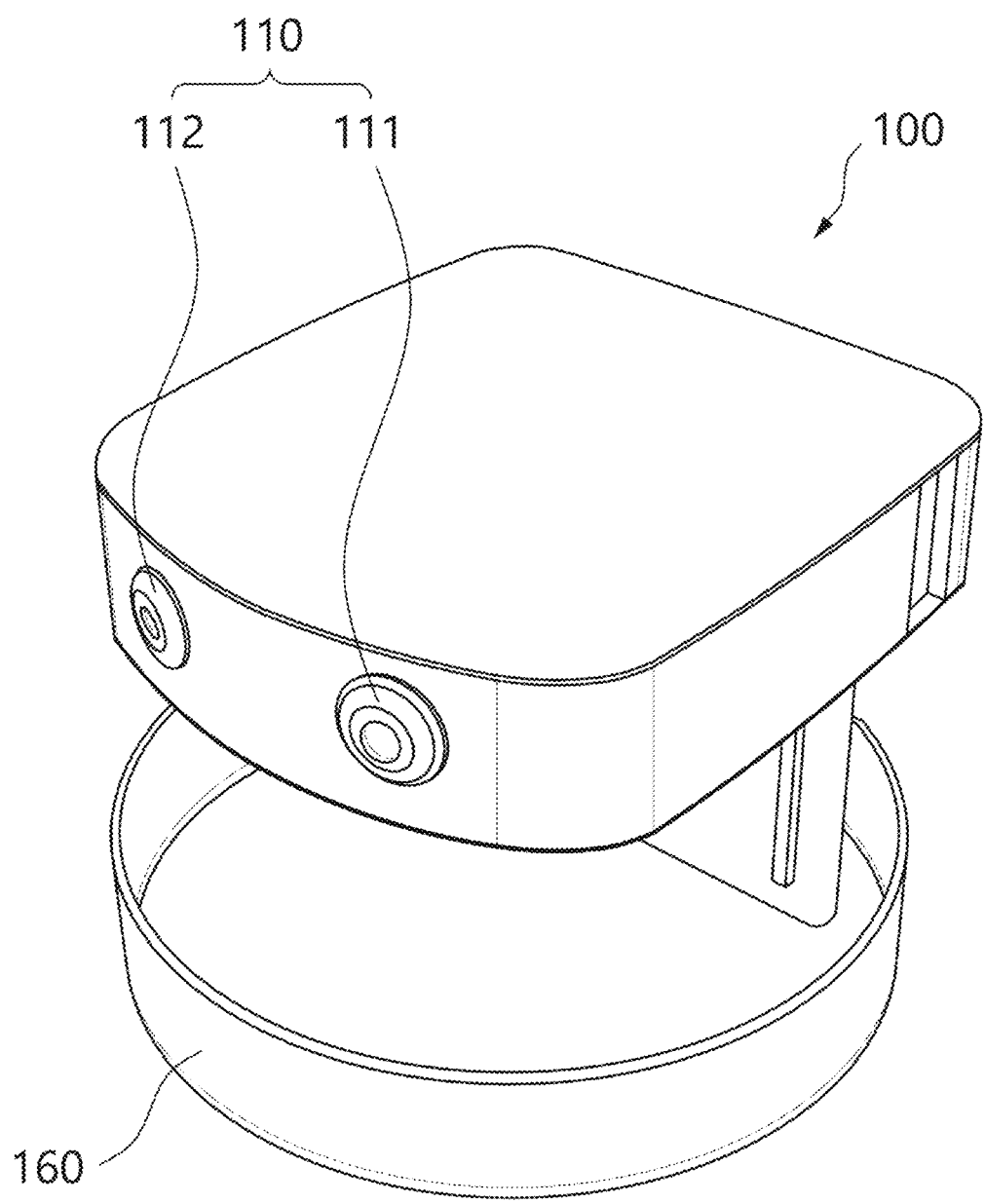
FIG. 8 is an illustration of a control device according to one embodiment of the present invention.

The control device 100 may further include a support unit 160 to be supported by a post of the net. The control device 100 may be secured to at least one of the posts located on either side of the end of the net. To this end, the control device 100 may include a support unit 160 that may be connected to the stanchions as shown in FIG. 8. Of course, the control device 100 may be mounted in other locations besides the posts, such as on the umpire table.

The ball machine unit 300 can move on the tennis court and launch balls to players. For example, the ball machine unit 300 may move on the tennis court and launch balls to players based on instructions from the control device 100.

As described above, the control device 100 may generate control signals to control the ball machine unit 300, and the ball machine unit 300 may receive the control signals from the control device 100 and perform actions such as moving or firing balls accordingly.

Hereinafter, the operation of the ball machine unit 300 according to the instructions of the control device 100 will be described in more detail.

According to one embodiment, the control device 100 may analyze the training situation in real time and instruct the ball machine unit 300 to move and launch the ball according to the results.

Hereinafter, the process by which the tennis self-training system 1 analyzes the training situation in real time and provides training to the player based on the results is referred to as an interactive training program. In comparison, a series of processes in which the tennis self-training system 1 provides training to the player according to a predetermined pattern is referred to as a general training program.

The control device 100 may calculate a position (hereinafter referred to as a "ball launch position") to which the ball machine unit 300 should move to launch the ball. The control device 100 may calculate the ball launch position by predicting the falling position of the ball hit by the player. The ball launch position may be the same as or near the predicted ball drop location.

The control device 100 may transmit a control signal including the ball launch position to the ball machine unit 300 to instruct the ball machine unit 300 to move to or near the ball launch position. The ball machine unit 300 may move to or near the ball launching position in accordance with the control signal.

The ball launch position may be expressed as an absolute position. For example, the ball launch position may be expressed as a specific location or coordinates on a tennis court.

Alternatively, the ball launch position may be expressed as a relative location. For example, the ball launch position may be expressed as a relative distance or direction that the ball machine unit 300 should move relative to its current location.

As described above, if the control device 100 first predicts a falling position of the ball and then secondarily corrects the falling position to predict a final falling position, the control device 100 may send a first message to the ball machine unit 300 instructing it to move to the first predicted falling position and a second message to the ball machine unit 300 instructing it to move to the second corrected final falling position.

By transmitting the message to the ball machine unit 300 twice in this manner, the ball machine unit 300 can move to the final fall position in advance in accordance with the first message after receiving the first message but before receiving the second message, so that the ball machine unit 300 can move to the final fall position faster than if the final fall position is predicted and the message is transmitted to the ball machine unit 300 only once.

Even if the control device 100 predicts the drop location over three or more times, the ball machine unit 300 can move similarly to the case of predicting the drop location over two times.

The control device 100 may calculate when the ball machine unit 300 will launch the ball (hereinafter referred to as the "ball launch time point").

The control device 100 may calculate the ball launching time based on at least some of the following: the location where the player hits the ball, the time when the player hits the ball, the ball recognition information, the ball tracking information, the speed of the ball hit by the player, the prediction information of the falling position of the ball hit by the player, the prediction information of the falling time point, and the composition of the ball hit by the player.

The control device 100 may transmit a control signal including the ball launching time to the ball machine unit 300 to instruct the ball machine unit 300 to launch the ball at the ball launching time. The ball machine unit 300 may launch the ball at the ball launching time according to the control signal.

The ball launch time point may be calculated to be the same as or similar to the time at which a human player strikes a ball when playing against a real person. For example, the ball launch time point may be a time when the ball hit by the player is predicted to land in the opposite half court. In another example, a predetermined amount of time (e.g., 0.01 seconds, 0.02 seconds, 0.03 seconds, 0.1 seconds, 0.2 seconds, 0.3 seconds, etc.) after the time when the player's ball is predicted to land in the opposite half court may be the time of the ball launch. Accordingly, the player can perform self-training as if actually playing with an opponent.

The ball machine unit 300 may move at different speeds depending on the situation. For example, the ball machine unit 300 may move at a speed determined based on at least one of the ball launch position and the ball launch time point. As a specific example, the ball machine unit 300 may move at a speed that allows the ball machine unit 300 to reach the ball launch position before the ball launch time point, taking into account the distance between the current location and the ball launch position and the ball launch time point.

Alternatively, the ball machine unit 300 may move at a constant speed. For example, the ball machine unit 300 may move at a certain initially set speed. Alternatively, the ball machine unit 300 can move at a specific speed entered by a user.

If the ball machine unit 300 reaches the ball launch position before the ball launch time point, the ball machine unit 300 may wait until the ball launch time point and then launch the ball at the ball launch time point.

The movement speed of the ball machine unit 300 may be determined by at least one of the control device 100 and the ball machine unit 300.

The control device 100 may monitor the position of the ball machine unit 300 to determine if it has completed moving to a directed location. If the ball machine unit 300 has not moved to the instructed position, the control device 100 may transmit a control signal to the ball machine unit 300 to further move to the instructed position. Accordingly, the ball machine unit 300 may further move to the indicated position.

The control device 100 may calculate ball attribute information including at least some of the attributes of the ball to be launched, such as a location to be reached by the ball machine unit 300 (hereinafter referred to as the "ball arrival position"), a direction to be launched, a ball composition to be launched, and a speed of the ball to be launched. The control device 100 may transmit a control signal including the ball property information to the ball machine unit 300 to instruct the ball machine unit 300 to launch the ball according to the ball property information. The ball machine unit 300 may launch the ball with a property according to the ball property information according to the control signal.

The control device 100 may calculate the ball property information by considering at least one of the player's position and the position of the ball machine unit 300.

The control device 100 may calculate a ball arrival position to be within a predetermined distance range from the player's location. In this case, the predetermined distance range may vary depending on the difficulty of the self-training. For example, the predetermined distance range may increase as the difficulty of the self-training increases.

As a specific example, the self-training mode may include an easy mode, a normal mode, and a hard mode, wherein the easy mode may be set to a radius of 1-1.5 meters from the player's location, the normal mode may be set to 2-4 meters, and the hard mode may be set to 5-10 meters.

In addition to the location of the ball, the difficulty level of the self-training may change the quality of the ball and the speed of the ball. For example, the higher the difficulty level of the self-training, the more difficult the ball may be to launch (e.g., by increasing the amount of spin on the ball), or the higher the speed of the ball may be.

The ball machine unit 300 can adjust its orientation to account for where the ball is reaching. The ball machine unit 300 can launch the ball within a predetermined angle range from left to right based on its direction. Thus, if the ball arrival position is not within the angular range, the ball machine unit 300 may adjust its orientation direction so that the ball arrival position is within the angular range, and then launch the ball.

The ball machine unit 300 may move to a preset position after launching the ball. The preset position may be a center position of the half court. In this case, the ball machine unit 300 may wait at the preset location, move as directed by the control device 100 to launch the ball, return to the preset location to wait, and repeat the process to provide training to the player.

Alternatively, the ball machine unit 300 may provide training to the player by waiting at the position from which the ball was launched, rather than moving after launching the ball, and then moving according to the instructions of the control device 100 to launch the ball, waiting at the position again, and waiting for the next instruction from the control device 100, and repeating the process.

Based on the above description, an example of how the control device 100 and the ball machine unit 300 may collaborate to provide interactive training to a player is described as follows.

The control device 100 predicts where the ball hit by the player will land in the opposite half court and when it will land, and determines the location of the ball machine unit 300.

The control device 100 calculates the ball launch position, the ball launch time point, and the ball property information in consideration of the predicted falling location, the falling time point, and the current position of the ball machine unit 300.

The control device 100 transmits the ball launch position, ball launch time point, ball arrival position, and ball launch speed to the ball machine unit 300.

The ball machine unit 300 receives the ball launch position, ball launch time point, ball arrival position, and ball launch velocity from the control device 100.

The ball machine unit 300 moves to the received ball launch position. During the movement of the ball machine unit 300 or after the ball machine unit 300 completes the movement, the control device 100 may confirm the position of the ball machine unit 300 and transmit control signals for further movement to move to the correct ball launch position.

The ball machine unit 300 controls its direction of movement based on the received ball arrival position. The ball machine unit 300 launches the ball at the received ball launch time point at the received ball launch speed. After launching the ball, the ball machine unit 300 can return to the position before it was moved.

The above describes an embodiment in which the ball machine part predicts where and when the ball hit by the player lands in the opposite half court, and the ball machine part moves and launches the ball in consideration of the predicted landing location and landing time. However, the implementation of the system presented by the present application is not limited to the aforementioned embodiments.

Hereinafter, other embodiments will be further described.

According to another embodiment, the control device 100 may instruct the ball machine unit 300 to move and launch a ball according to a predetermined pattern. The predetermined pattern may include information about at least some of a path, a ball launch position, a ball launch time point, a ball arrival position, a ball launch speed, a ball launch count, a ball launch interval, and a ball launch composition. In this case, the tennis self-training system 1 can be viewed as providing a general training program to the player.

The predetermined pattern may be selected by the user. For example, the user may select the predetermined pattern from a plurality of patterns.

The user may select the predetermined pattern via the mobile device 200. The pattern selected by the user is transmitted to the control device 100, and the control device 100 may generate a control signal according to the pattern selected by the user. The control device 100 transmits the generated control signal to the ball machine unit 300, and the ball machine unit 300 can move and launch the ball according to the pattern selected by the user.

The predetermined pattern may be a pattern set by the user. For example, the user may set the predetermined pattern via the mobile device 200. More specific details regarding the user setting the pattern will be discussed later.

According to another embodiment, the ball machine unit 300 may operate in response to a user's operation. The user may operate the ball machine unit 300 by entering user input via the mobile device 200. The user input may be transmitted to the control device 100, and the control device 100 may generate control signals based on the user input.

The control device 100 may transmit the generated control signal to the ball machine unit 300, and the ball machine unit 300 may move and launch the ball according to the user input. More specific details related to the user operating the ball machine unit 300 via the mobile device 200 will be described later.

On the other hand, while the control device 100 has been described above as generating control signals when the ball machine unit 300 is operated, the control signals may also be generated by the mobile device 200. In this case, the control signal generated by the mobile device 200 may be transmitted from the mobile device 200 to the ball machine unit 300 without going through the control device 100, or the control signal may be transmitted from the mobile device 200 to the ball machine unit 300 through the control device 100.

Figure 9:
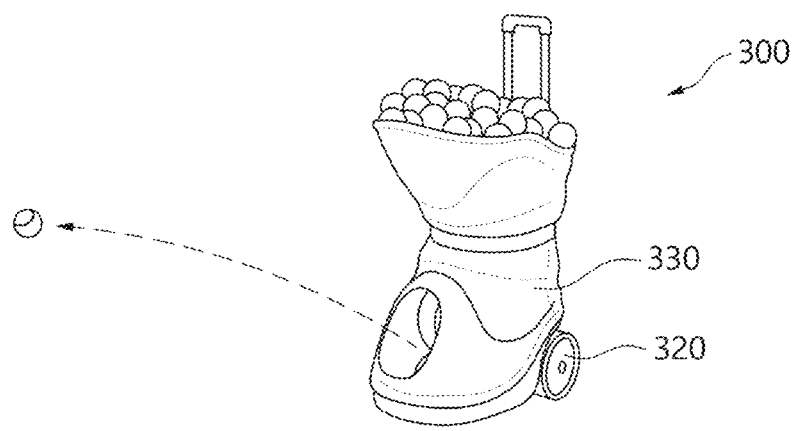
FIG. 9 is a diagram illustrating a ball machine unit according to one embodiment of the present invention.
Figure 9:
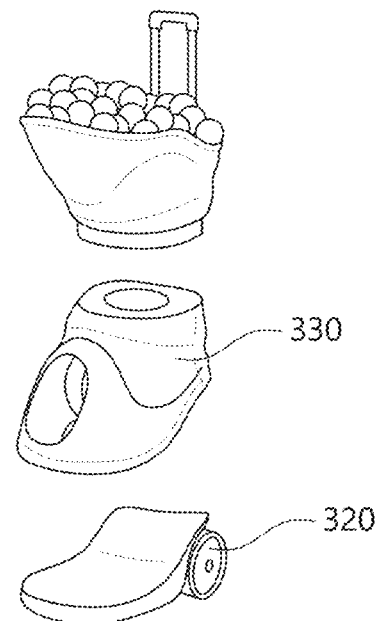

As shown in FIGS. 2 and 9, the ball machine unit 300 may include a processor 310, a driving unit 320, a launcher 330, and a communication unit 340.

Actions performed by the ball machine unit 300 may be performed by the processor 310, or may be performed by the processor 310 controlling other components of the ball machine unit 300.

The same or similar to the processor 130 of the control device 100 described above, the processor 310 may perform various information processing and operations within the ball machine unit 300 and/or control other components comprising the ball machine unit 300. Any description of the processor 310 that is redundant with the processor 130 of the control device 100 will be omitted.

The driving unit 320 functions to move the ball machine unit 300. When the ball machine unit 300 receives information about a location from the mobile device 200 or the control device 100, the ball machine unit 300 can be moved to that location by driving the driving unit 320.

The driving unit 320 may include a swerve driving system or a mecanum wheel.

The launcher 330 functions to launch a ball from the ball machine unit 300.

The launcher 330 may include one or more rollers. Rotation of the rollers may cause the ball to be launched from the launcher 330. As the speed of rotation, direction of rotation, etc. of the rollers is adjusted, the speed, spin, etc. of the launched ball may be adjusted.

The launcher 330 may include a sensor (e.g., photointerrupter) capable of measuring the rotational speed of the roller. The measured rotational speed may be utilized to control the rotational speed of the roller. For example, if the measured rotational speed is different from the instructed rotational speed, the rotational speed of the roller can be controlled to reflect the instructed rotational speed. This allows for more precise control of the speed, spin, etc. of the ball.

The communication unit 340 may be communicably connected via the network 10 with at least some of the control device 100, the mobile device 200, and the server 400 to send and receive data wired or wirelessly. The foregoing description of the communication unit 150 of the control device 100 may also apply to the communication unit 340 of the ball machine unit 300, and redundant descriptions will be omitted.

The ball machine unit 300 may include at least one of a speaker and an LED. The ball machine unit 300 may output a notification signal via the at least one of the speaker and the LED before the start of the ball launch or before the end of the ball launch, depending on the settings predetermined by the user. The user can set the location, speed, number, timer, etc. of balls to be launched via the mobile device 200. After the user completes the settings, the user enters the start signal on the mobile device 200, moves to a position where the ball can be hit, and the set timer is activated. The ball machine unit 300 may notify the user via an LED or speaker that the ball is about to be launched n seconds before launch. In this case, the LED and speaker are only activated at the beginning and end of the ball launch. Furthermore, the ball machine unit 300 may notify the user that the launch is about to end via an LED or a speaker n seconds before the end of the launch.

The ball machine unit 300 may include sensors (e.g., radar sensors, lidar sensors, etc.) to recognize surrounding objects. The ball machine unit 300 may recognize nearby obstacles with the sensors. If the ball machine unit 300 recognizes an obstacle with the sensors while moving to a target location, the ball machine unit 300 may avoid the obstacle and move to the target location.

The ball machine unit 300 may include a serve launcher. The serve launcher may launch a ball similar to a human putting in a tennis serve. Compared to the launcher 330, the serve launcher may be implemented to launch the ball from a higher position than the launcher 330. The foregoing description of the launcher 330 may likewise apply to the sub-launcher.

The ball machine unit 300 may include both the launcher 330 and the sub-launcher. Alternatively, the ball machine unit 300 may include only one of the launcher 330 and the sub-launcher.

The ball machine unit 300 can include a ball organizer. The ball organizer may collect and organize balls that fall to the court floor.

The ball machine unit 300 may move under the direction of the control device 100 and organize the balls through the ball organizer.

In one example, the control device 100 may recognize a ball based on image data and move the ball machine unit 300 to the location of the recognized ball to organize the ball through the ball organizing part. At this time, since it is necessary to recognize a non-moving ball, the control device 100 may use an algorithm for recognizing a non-moving ball (e.g., an algorithm that does not use a frame difference image) among the ball recognition algorithms described above.

In another example, the control device 100 may direct the ball machine unit 300 to move around the court and its surroundings in a predetermined pattern, whereby the ball machine unit 300 may collect and organize balls through a ball organizer as it moves.

The ball machine unit 300 may be provided modularly. A modularly provided ball machine part (hereinafter referred to as a "modular ball machine part") 300 refers to a ball machine unit 300 provided with a plurality of detachable modules combined. For example, as shown in FIG. 9, the ball machine unit 300 may be provided with a driving unit 320 and a launcher 330 that are removably combined. In this case, the driving unit 320 and the launcher 330 may be referred to as the drive module and the launch module, respectively. Each of the aforementioned components of the ball machine unit 300 may be provided as a separate module.

The modular ball machine unit 300 may have an integrated control unit for controlling the individual modules. Alternatively, the individual modules of the modular ball machine unit 300 may each have separate controls. For example, for a ball machine unit 300 that includes a drive module and a launch module, the drive module can have a first control unit and the launch module can have a second control unit.

The modular ball machine unit 300 may have an integrated communication unit. Alternatively, the individual modules of the modular ball machine unit 300 may each have separate communication units. For example, for a ball machine unit 300 that includes a drive module and a launch module, the drive module can have a first communication unit and the launch module can have a second communication unit.

If the individual modules each have separate communication units, at least some of the individual modules may be communicably connected via the communication units.

If the individual modules each have separate communication units, at least some of the individual modules may be communicably connected to the control device 100 and the network 10. In one example, each of the individual modules may all be connected to the control device 100. In another example, only certain modules, some of the individual modules, may be connected to the control device 100. In this case, the specific module may be communicably coupled to the remaining modules. The specific module may transmit information received from the control device 100 to the remaining modules, or may transmit information received from the remaining modules to the control device 100. In other words, the control device 100 and the remaining modules may communicate via the specific module.

The mobile device 200 may be communicably connected to at least some of the control device 100, the ball machine unit 300, and the server 400 via the network to send and receive data. The mobile device 200 may include, but is not limited to, smartphones, cell phones, laptops, tablet PCs, and smart watches.

The user may be provided with various types of training programs from the tennis self-training system 1. In this case, the user may select a specific program among the various types of training programs via the mobile device 200 to receive training according to the specific program from the tennis self-training system 1. For example, the user may select an interactive training program or a general training program via the mobile device 200.

The mobile device 200 may transmit the user's selection to the control device 100, and under the control of the control device 100, the ball machine unit 300 may move and launch the ball to provide training to the user according to the training selected by the user. The selected program may be transmitted directly to the ball machine unit 300, and the ball machine unit 300 may launch the ball to the player according to the program. Alternatively, the mobile device 200 may send certain control signals to the ball machine unit 300 based on the content of the program, and the ball machine unit 300 may launch the ball to the player based on the program. Since the interactive training program has been described above, a general training program will be described in more detail below.

The general training program may include a plurality of modes.

The general training program may include a user mode that allows the user to set a ball launch position and a ball arrival position. In this case, the ball machine unit 300 may launch the ball from the ball launch position to the ball arrival position based on the user's settings. Hereinafter, a routine is described as including a ball launch position and a corresponding ball arrival position, and a routine is described as including one ball launch position and one corresponding ball arrival position. In other words, if any of the ball launch positions and ball arrival positions are different, it is a different routine.

Figure 10:
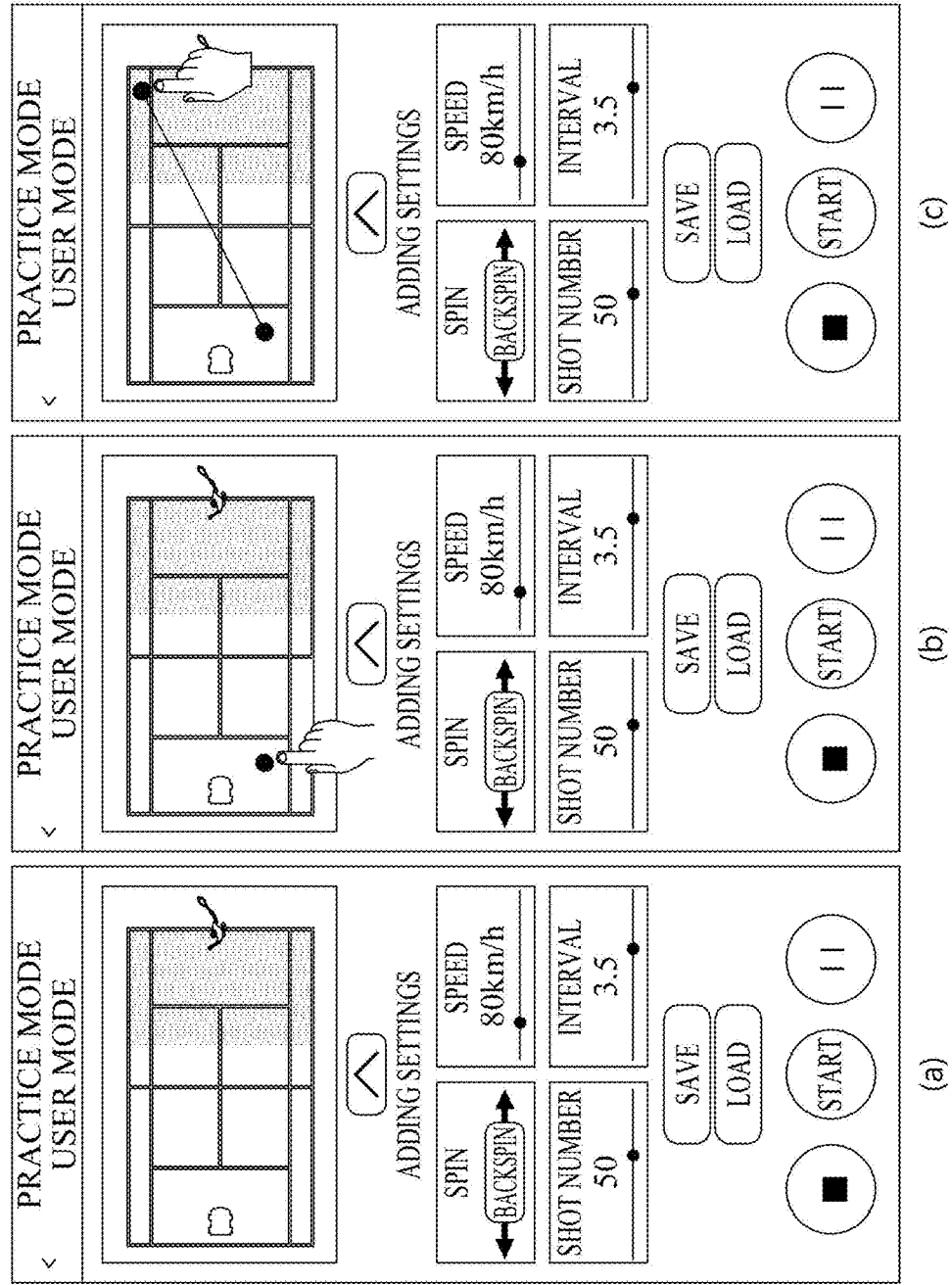
FIGS. 10 and 11 are drawings of a user mode according to one embodiment of the present invention.
Figure 11:
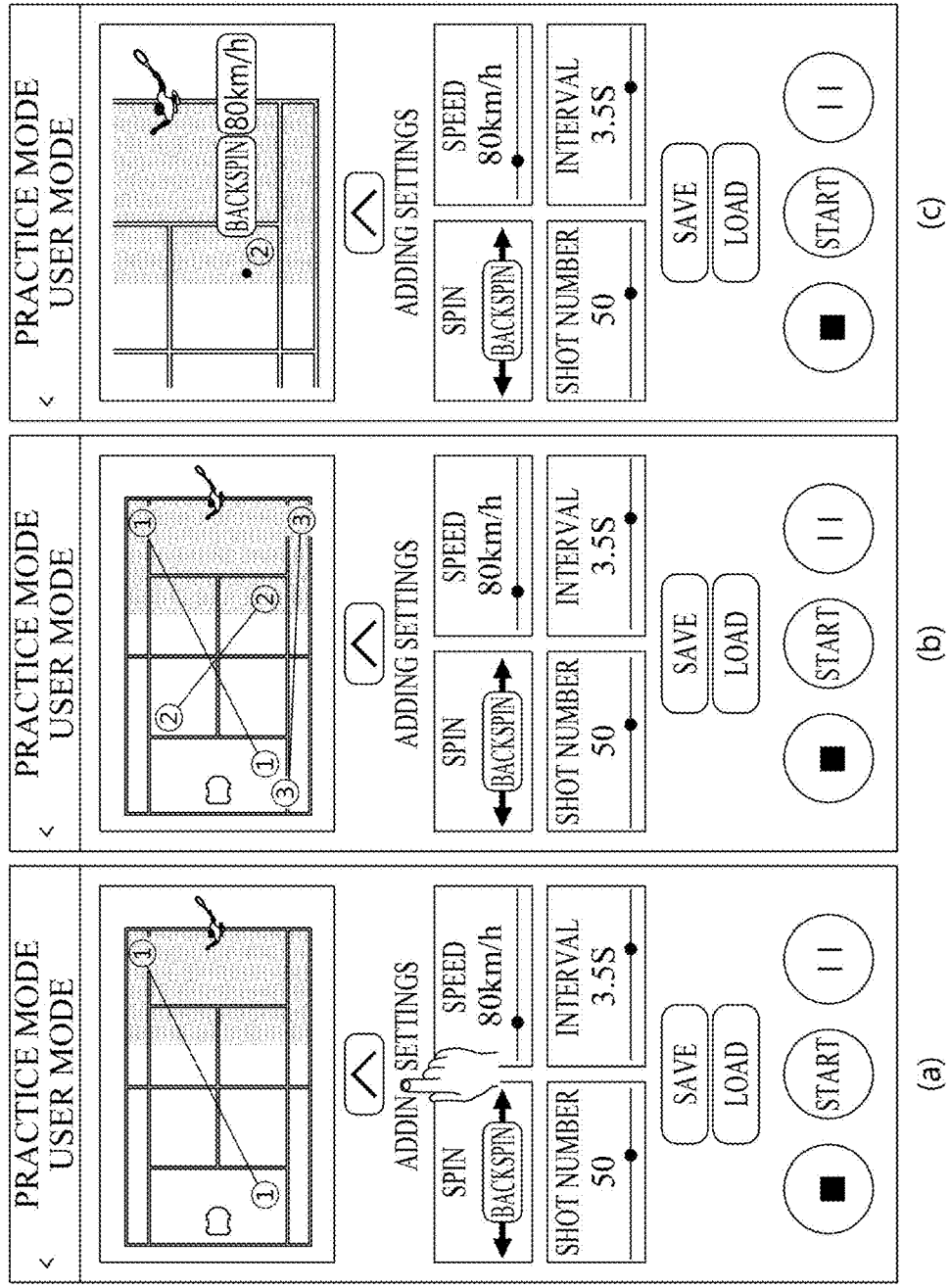

The following describes the user mode in more detail with reference to FIGS. 10 and 11.

As illustrated in FIGS. 10 and 11, a user may set a routine by touching a screen of the mobile device 200 (if the screen is a touch screen), clicking with an input device such as a mouse, or the like.

In one example, the user may touch a point on one half court of the tennis court area displayed on the screen of the mobile device 200 to set it as a ball launch position (FIG. 10(*b*)), and touch a point on the other half court to set it as a ball arrival position (FIG. 10(*c*)).

In another example, the user may touch a point on one half court of the tennis court area displayed on the screen of the mobile device 200, slide to a point on the other half court, and release the touch to set the point on one half court as the ball launch position and the point on the other half court as the ball arrival position.

In another example, the user may move the two reference points displayed with the tennis courts on the screen of the mobile device 200 to the first point of one half court and the second point of the other half court, respectively, to set the first point of one half court as the ball launch position and the second point of the other half court as the ball arrival position.

Referring to FIG. 11(*b*), the user may set two or more routines. For example, if the user sets two routines, the user may set a first ball launch position and a corresponding first ball arrival position, and a second ball launch position and a corresponding second ball arrival position. In this case, the ball machine unit 300 may launch a ball from the first ball launch position to the first ball arrival position, move from the first ball launch position to the second ball launch position, and launch a ball from the second ball launch position to the second ball arrival position. In other words, the user mode allows the user to set the ball machine unit 300 to move along a predetermined path and launch balls.

Referring to FIG. 11(*c*), the user can zoom in on the tennis court displayed on the screen of the mobile device 200 to fine-tune the routine. Additionally, the user may modify the preset routine.

Referring to FIGS. 11(*a*) and (*b*), the routine set by the user may be displayed on the screen of the mobile device

200. The sequence of the routines may be displayed together. The ball machine unit 300 may operate in accordance with the order of the routines.

As illustrated in FIGS. 10 and 11, in addition to the ball launch position and the ball arrival position, the user may set additional information including at least some of the following: ball launch time point, ball launch speed, number of balls, ball launch interval, and ball launch composition. In this case, the routine may further include the above additional information. Also, in other cases, the ball launch position, the ball arrival position, and at least some of the additional information may be different. For example, it is a different routine if the ball launch position and the ball arrival position are the same, but the ball launch speed is different. As with the ball launch position and ball arrival position, the user can also modify the above additional information after setting it.

The user may select a user mode via the mobile device 200 to perform the training according to the set user mode. The mobile device 200 may send a message to the control device 100 indicating that the user has selected the user mode, and the control device 100 may generate a control signal for controlling the ball machine unit 300 according to the user mode. The control device 100 may transmit the control signals to the ball machine unit 300, and the ball machine unit 300 may move and launch balls according to the control signals to provide the user with training according to the user mode.

The general training program may include a coach mode in which the user can directly operate the ball machine unit 300. In coach mode, the mobile device 200 may provide a screen for controlling the ball machine unit 300.

Figure 12:
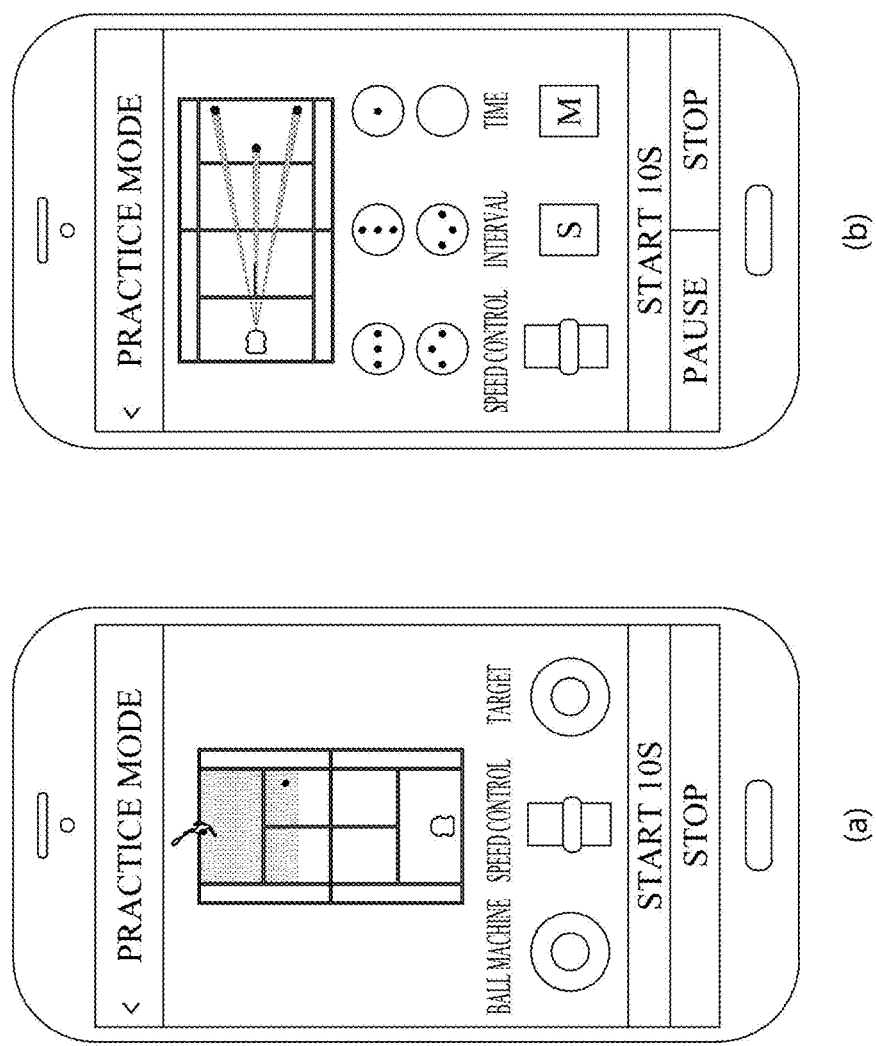
FIG. 12 is a drawing of a coach mode and a stationary mode according to one embodiment of the present invention.

For example, as shown in FIG. 12(*a*), the screen of the mobile device 200 may display at least one of buttons for manipulating the position of the ball machine unit 300, buttons for manipulating the speed of the ball launched from the ball machine unit 300, and buttons for manipulating the position of the ball reach. The user may operate the displayed button to manipulate at least one of the position of the ball machine unit 300, the velocity of the ball launched from the ball machine unit 300, and the ball arrival position. Alternatively, the user may manipulate at least one of the position of the ball machine unit 300, the velocity of the ball launched from the ball machine unit 300, and the ball landing position via a separate input device (e.g., joystick, etc.) associated with the mobile device 200.

The location specified by the user may refer to specific coordinates or locations on the tennis court displayed on the screen of the mobile device 200. In this case, the player can play a tennis match with the ball machine unit 300 being manipulated in real time by the user.

A typical training program may include a stationary mode in which the ball machine unit 300 does not move. As shown in FIG. 12(*b*), in the stationary mode, the ball machine unit 300 may launch a ball from a certain location to one or more ball destination locations according to a predetermined ball launch rate, number of ball launches, ball launch interval, ball launch composition, ball launch time point, or the like.

In addition to the interactive training program and the general training program, the user can perform training using a pattern program for each player configured based on the data of the player to be opposed, including foreign famous players, or a weakness attack program configured to attack the weakness based on the user's weakness information.

Figure 13:
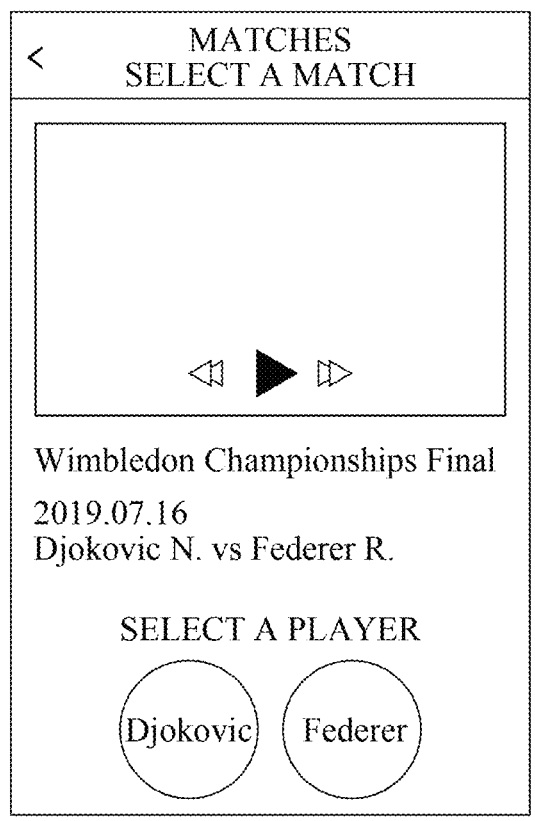
FIG. 13 is a diagram illustrating an example of an application screen delivered via a mobile device, according to one embodiment of the present invention.

For example, as shown in FIG. 13, the mobile device 200 may provide a game screen of a professional player desired by the user based on the player-specific pattern program. In this case, when the user selects a professional player of his or her choice, a practice program tailored to the player's playing pattern can be performed. That is, predetermined information about the professional player selected on the screen of the mobile device 200 (meaning the playing style or pattern of the professional player) is transmitted to the ball machine unit 300, and the ball machine unit 300 launches a ball to the user based on the information provided. This allows the user to have an experience similar to playing a game with a professional player of their choice.

The server 400 may be communicably coupled to at least one of the control device 100 and the mobile device 200 via the network 10 to send and receive data. The server 400 may be implemented as at least one computer device that provides commands, code, files, content, services, etc. and may include, but is not limited to, storage space. The server 400 may be a cloud server.

The server 400 may recognize the user's exercise pattern, exercise skill, exercise posture, etc. based on the video data, and may analyze the video data to provide the user with coaching data such as posture correction solutions, weakness solutions, training programs, etc. The user can check the coaching data through the mobile device 200 or proceed with training according to the coaching data.

The server 400 may recognize the user's exercise posture using the video data. For example, the server 400 may recognize the user's exercise posture using video data received from at least one of the control device 100 and the mobile device 200.

The server 400 may recognize the user's exercise posture using video data corresponding to a time when the user performs the swinging motion. In other words, the video data may be edited to exclude times when the user is not performing the swing motion. For example, the control device 100 may determine a swing section of the user in the entire game video and extract video data corresponding to the section. Alternatively, the control device 100 may determine a portion of the entire game video where the ball is located in the half court where the user is located and extract video data corresponding to the portion. The control device 100 may transmit the extracted video data of the swing section to the server 400. The server 400 may recognize an exercise posture of the user using the received video data.

According to one embodiment, the server 400 may recognize the exercise posture by identifying joint points using the video data.

Figure 14:
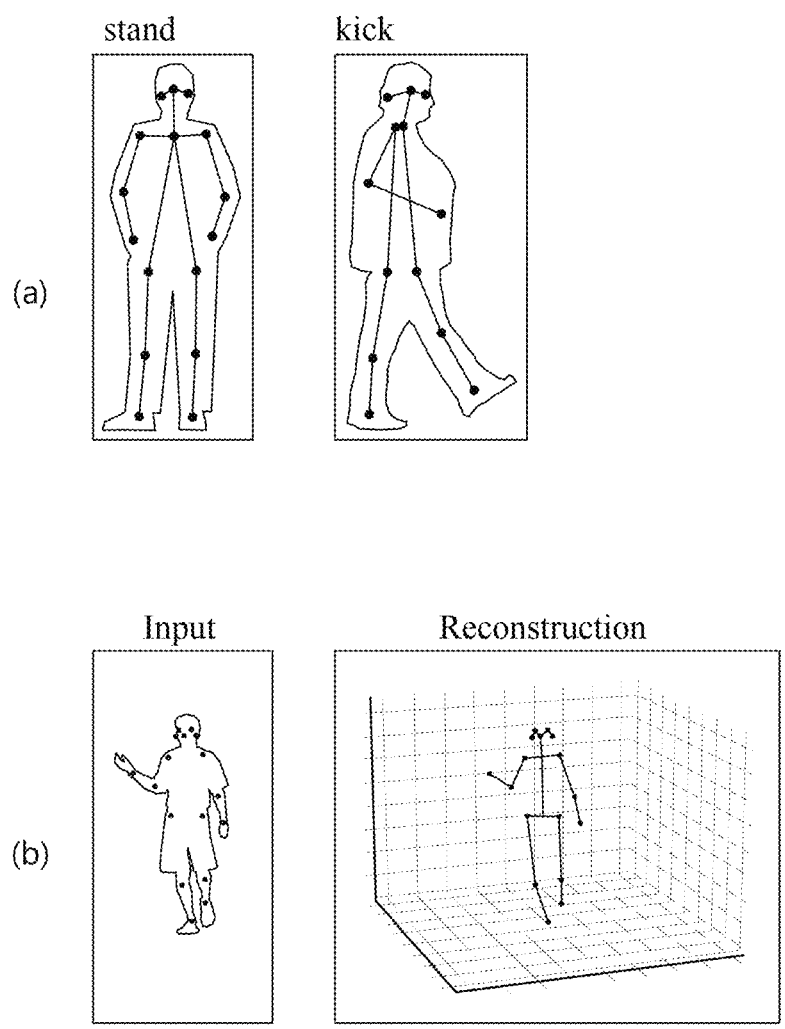
FIG. 14 is a diagram of a server recognizing an exercise posture, according to one embodiment of the present invention.

The server 400 may identify the joint points using the video data. As shown in FIG. 14(*a*), the location of the joint points may be represented by coordinates in two dimensions (e.g., coordinates in an image). Alternatively, as shown in FIG. 14(*b*), the location of the articulation point may be represented by coordinates in three dimensions.

The server 400 may utilize the articulation points to determine what action the user performed. For example, the server 400 may use the joint points to determine if the user swung, what kind of swing (e.g., forehand stroke, backhand stroke, serve, volley, etc.), and the like.

The server 400 may utilize the joint points to calculate joint angles. For example, the server 400 may calculate the joint angle by connecting the joint points with lines according to a predetermined relationship and calculating an angle between the connected lines.

The server 400 may analyze the user's exercise posture and provide coaching data to the user.

The coaching data may include whether the user performed the movement correctly. In this context, an incorrect movement may refer to a movement or position that is associated with a higher risk of injury.

In one example, the server 400 may use joint angles to determine whether the user performed the movement correctly. For example, the server 400 may determine that the user performed an incorrect motion if the joint angle is outside a predetermined range.

Alternatively, the server 400 may determine that the user performed an incorrect motion if the amount of change over time of the joint angle is outside a predetermined range. The predetermined range may be based on a range of motion (ROM). The range of motion may be determined differently for each user. In this case, the user may enter his or her range of motion via the mobile device 200 or the like, and the server 400 may determine whether the user performed the movement correctly based on the range of motion entered by the user.

In another example, the server 400 may determine whether the user performed the motion correctly using a model trained based on video of the correct posture and video of a posture with a high risk of injury.

The server 400 may input the user's video data into the model to determine whether the user's video data is a correct posture or a posture with a high risk of injury. Examples of such models include, but are not limited to, machine learning models and deep learning models.

As another example, the server 400 may substitute at least some of the joint points and joint angles into a kinematics-based formula of acceleration, velocity, radius of gyration, etc. to determine whether the user performed the motion correctly.

Figure 15:
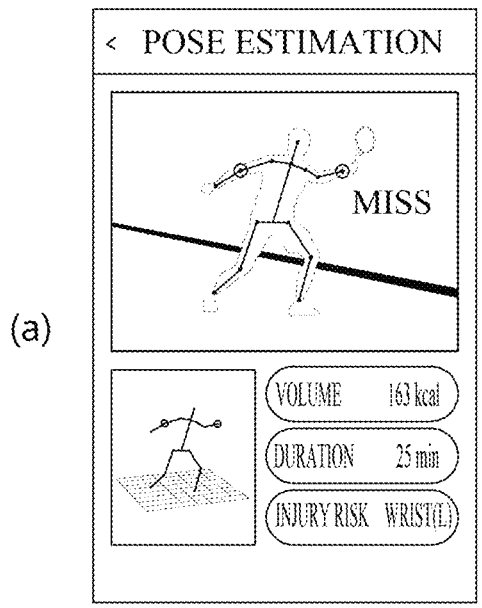
FIG. 15 is a diagram of coaching data provided via a mobile device in accordance with one embodiment of the present invention.
Figure 15:
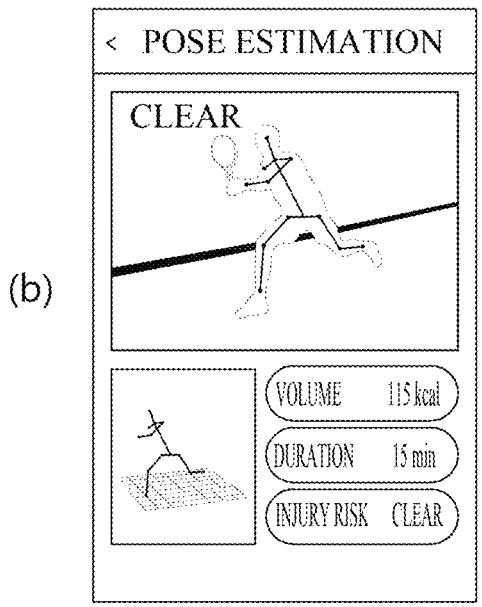

The coaching data may include an injury risk. The server 400 may calculate an injury risk for a joint based on at least some of a joint point and a joint angle. As illustrated in FIG. 15(*a*), the server 400 may provide a video of the user's ball strike and the injury risk via the mobile device 200.

The coaching data may include a correction for joint rotation radius. The server 400 may calculate a correction value for the joint rotation radius based on at least a portion of the joint point and the joint angle. Based on the correction values, the server 400 may derive a posture correction solution that may complement the user's posture.

The coaching data may include at least a portion of the time, distance, and calories burned by the user during the game. The server 400 may calculate at least a portion of the time, distance, and calories burned by the user during the game based on the video data.

The coaching data may include vulnerability solutions that may compensate for the user's vulnerabilities. The server 400 may analyze the user's vulnerability and derive a vulnerability solution based on the user's exercise pattern, exercise skill, exercise posture, and the like.

The user's movement pattern may include the speed, direction, trajectory, and type of stroke (forehand, backhand, serve, knob, volley, smash, slice, etc.) of the ball hit by the user, the user's posture when hitting the ball, the area where the ball contacts the racket, and the like, and the user's athletic performance may include the speed, trajectory, match score (derived based on the in/out information of the ball), and the degree to which the ball is close to the outline. For example, based on the in-out judgment, the user's vulnerability can be identified based on the user's posture at the time the ball was out, the area where the ball contacted the racket, the type of stroke, the speed, direction, and trajectory of the ball, and the point where the ball landed. From this, a program can be designed to strengthen your weaknesses. Or, more simply, if the user is right-handed and has a poor response to a ball coming from his left side, the server 400 may determine that the user lacks skill in the backhand stroke, which is a weakness. Thus, the server 400 may derive a vulnerability solution that allows the user to strengthen the backhand stroke.

The server 400 may derive a training program that corresponds to the user's athletic skill based on the user's exercise pattern, athletic skill, athletic posture, and the like, and may send the training program to the mobile device 200.

The server 400 may set the direction, speed, etc. of the ball corresponding to the athletic skill and derive the training program according to these settings. The training program is transmitted from the server 400 to the mobile device 200 and output to the user. This allows the user to practice with the training program provided by the server 400 or to practice with a training program of their choice. The training program may be a broad concept that includes all of the above-mentioned posture correction solutions, vulnerability solutions, etc. In addition, a customized optimization solution that combines the above-mentioned posture correction solution and vulnerability solution may be provided.

Coaching data, such as posture correction solutions, weakness solutions, and training programs, may be provided to a user via a mobile device 200, such as in the example shown in FIG. 15. The example illustrated in FIG. 15 is described as follows. With respect to athletic posture, based on data about the joint points at which the user strikes the ball, information such as angles of the wrists, arms, legs, ankles, torso, etc. with respect to each other can be derived and configured to display a "Clear" when the user strikes the ball in a lower risk of injury posture compared to a preset/stored higher risk of injury posture (FIG. 15(*b*)) and a "Miss" otherwise (FIG. 15(*a*)).

The server 400 may perform at least some of the operations of the control device 100 described above. At least some of the various operations described as being performed by the control device 100 may be performed by the server 400.

While the tennis self-training system 1 has been described above primarily with respect to a case in which a player can practice tennis alone without an opponent, it is not excluded that the tennis self-training system 1 may be utilized in a case in which the player plays tennis with an opponent (the opponent may also be referred to as a player).

In this case, the player may utilize the tennis self-training system 1 based on components other than the ball machine unit 300. In one example, the player may use the control device 100 to calculate a score. In another example, the player may use the control device 100 to determine whether a ball is in or out. In yet another example, the player may be provided with coaching data using the control device 100.

The present invention is not limited to tennis, but can be applied to any sport with a net or court (table tennis, badminton, futsal, etc.). Furthermore, the technical features of the present invention can be applied to the construction of an self-training system for soccer, basketball, baseball, etc. that does not include a net or court. In other words, the present invention can be applied to any sport regardless of the field.

The technical features disclosed in each embodiment of the present invention are not limited to that embodiment, and the technical features disclosed in each embodiment can be combined and applied to different embodiments unless they are incompatible with each other.

Embodiments of the tennis self-training system of the present invention have been described above. The invention is not limited to the above-described embodiments and accompanying drawings, and various modifications and variations will be apparent to one having ordinary skill in the field to which the invention belongs. Accordingly, the scope of the invention is to be defined not only by the claims of this specification, but also by those equivalents of these claims.

The invention claimed is:

1. A tennis self-training system, comprising:
a control device comprising a recording unit configured to record a tennis game and a processor configured to analyze the tennis game based on a video obtained from the recording unit; and
a ball machine unit configured to move and launch a ball according to the instructions of the control device;
wherein the control device is configured to:
determine the position of a player and the position of the ball machine unit based on the video,
detect the upward and downward movement direction of the ball based on the video, and
determine time point when the movement direction changes from the downward direction to the upward direction as the falling time point of the ball,
extract an image frame corresponding to the falling time point of the ball from the video,
convert a viewpoint of the extracted image frame,
determine the falling position of the ball based on the image frame that the viewpoint is converted,
calculate a ball launch position and a ball arrival position of the ball machine unit based on the position of the player and the falling position of the ball,
generate a control signal related to the ball launch position and the ball arrival position,
transmit the control signal to the ball machine unit,
wherein the ball machine unit is configured to:
receive the control signal from the control device,
move to the ball launch position indicated by the received control signal, and
launch the ball to the ball arrival position indicated by the received control signal.

2. The system of claim 1,
wherein the control device is configured to determine whether the ball is in-out according to the falling position of the ball.

3. The system of claim 2,
wherein the control device is configured to calculate game scores according to the determined in-out status.

4. The system of claim 1,
wherein the control device is configured to:
receive the location of at least one point on the tennis court from the user, and
recognize the line of the tennis court based on the location of at least one point input from the user.

5. The system of claim 4,
wherein the control device is configured to:
recognize the base line and the doubles sideline of the tennis court based on the location of at least one point input from the user, and
generate at least one of a service lines, center service lines and singles sideline from the recognized base line and doubles sideline based on the specifications of the tennis court.

6. The system of claim 4,
wherein the control device is configured to:
extract pixels corresponding to the lines in the video based on the location of at least one point input from the user, and
recognize the lines from the extracted pixels.

7. The system of claim 1,
wherein the control device is configured to:
obtain user input related to the difficulty of the self-training, and
determine the ball arrival position according to the difficulty of the self-training.

8. The system of claim 7,
wherein the control device is configured to determine the ball arrival position within a predetermined distance range based on the position of the player,
wherein the predetermined distance range is set to increase as the difficulty of the self-training increases, so that the ball arrival position is determined to a position farther from the player as the difficulty of the self-training increases.

9. A tennis self-training system, comprising:
a control device comprising a recording unit configured to record a tennis game and a processor configured to analyze the tennis game based on a video obtained from the recording unit; and
a ball machine unit configured to move and launch a ball according to the instructions of the control device;
wherein the recording unit comprises a first camera for photographing one half court and a second camera for photographing the other half court,
wherein the control device is configured to:
determine the position of a player and the position of the ball machine unit based on the video,
predict a primarily falling position of the ball hit by the player based on the video,
correct the primarily falling position of the ball based on the second video obtained from the second camera,
calculate a ball launch position and a ball arrival position of the ball machine unit based on the position of the player and the falling position of the ball,
generate a control signal related to the ball launch position and the ball arrival position, and
transmit the control signal to the ball machine unit,
wherein the ball machine unit is configured to:
receive the control signal from the control device,
move to the ball launch position indicated by the received control signal, and
launch the ball to the ball arrival position indicated by the received control signal.

* * * * *